US007953630B2

(12) United States Patent
Fowler et al.

(10) Patent No.: US 7,953,630 B2
(45) Date of Patent: May 31, 2011

(54) MARKETING SYSTEMS AND METHODS

(75) Inventors: Malcolm R. Fowler, Coquitlam (CA); Robert E. Tucker, Delta (CA); Michael A. Lukas, Coquitlam (CA)

(73) Assignee: Moneris Solutions Corporation, Toronto, Ontario (CA)

( * ) Notice: Subject to any disclaimer, the term of this patent is extended or adjusted under 35 U.S.C. 154(b) by 2517 days.

(21) Appl. No.: 09/935,884

(22) Filed: Aug. 22, 2001

(65) Prior Publication Data

US 2002/0026348 A1 Feb. 28, 2002

Related U.S. Application Data

(60) Provisional application No. 60/227,150, filed on Aug. 22, 2000, provisional application No. 60/229,626, filed on Aug. 31, 2000.

(51) Int. Cl.
*G07G 1/14* (2006.01)

(52) U.S. Cl. .......... 705/14

(58) Field of Classification Search .......... 705/14
See application file for complete search history.

(56) References Cited

U.S. PATENT DOCUMENTS

| | | | | |
|---|---|---|---|---|
| 4,669,730 A | | 6/1987 | Small | 273/138 |
| 4,723,212 A | | 2/1988 | Mindrum et al. | 364/401 |
| 4,815,741 A | | 3/1989 | Small | 273/138 |
| 4,910,672 A | | 3/1990 | Off et al. | 364/405 |
| 5,173,851 A | | 12/1992 | Off et al. | 364/401 |
| 5,612,868 A | | 3/1997 | Off et al. | 364/214 |
| 5,687,322 A | * | 11/1997 | Deaton et al. | 705/14 |
| 5,774,868 A | | 6/1998 | Cragun et al. | 705/10 |
| 5,774,870 A | | 6/1998 | Storey | 705/14 |
| 5,804,806 A | | 9/1998 | Haddad et al. | 235/383 |
| 5,832,457 A | | 11/1998 | O'Brien et al. | 705/14 |
| 5,845,259 A | | 12/1998 | West et al. | 705/14 |
| 5,892,827 A | | 4/1999 | Beach et al. | 380/24 |

(Continued)

FOREIGN PATENT DOCUMENTS

AU 0712925 1/1997

(Continued)

OTHER PUBLICATIONS

Ernex Marketing Technologies, Inc. brochure showing product.

(Continued)

*Primary Examiner* — Arthur Duran
(74) *Attorney, Agent, or Firm* — Ogilvy Renault LLP

(57) ABSTRACT

The present invention relates to real-time, automated marketing programs implementing one or more program rules matrix modules that calculate benefits to customers based on one or more customer identifier(s), one or more merchant identifier(s) and one or more customer behavior(s). In one embodiment, program rules matrix modules implement Points Multiplier Program(s) that award benefits in an accelerated fashion, based upon one or more qualifying customer identifier(s), merchant identifier(s), and customer behavior (s). Marketing programs are implemented using a host controller that communicates with a plurality of remote transaction systems to provide real-time, individualized, automated awards and sophisticated multi-variable analysis of transaction data. Another aspect of the present invention relates to systems and methods implementing a plurality of marketing programs, offered by a plurality of merchants or merchant groups, upon presentation of a qualifying identifier, such as a (single) transaction card. Yet another aspect of the present invention provides methods and systems enabling a "single-swipe" transaction, wherein data is selectively packeted and transmitted to one or more institutions following a single electronic reading of a transaction card.

12 Claims, 9 Drawing Sheets

U.S. PATENT DOCUMENTS

| | | | | |
|---|---|---|---|---|
| 5,923,016 | A | 7/1999 | Fredretgill et al. | 235/380 |
| 5,932,869 | A | 8/1999 | Gottlich et al. | 235/493 |
| 5,960,411 | A | 9/1999 | Hartman et al. | 705/26 |
| 5,974,399 | A | 10/1999 | Giuliani et al. | 705/14 |
| 6,009,412 | A | 12/1999 | Storey | 705/14 |
| 6,014,635 | A | 1/2000 | Harris et al. | 705/14 |
| 6,026,370 | A | 2/2000 | Jermyn | 705/14 |
| 6,055,573 | A | 4/2000 | Gardenswartz et al. | 709/224 |
| 6,061,660 | A * | 5/2000 | Eggleston et al. | 705/14 |
| 6,070,147 | A | 5/2000 | Harms et al. | 705/14 |
| 2002/0004754 | A1 * | 1/2002 | Gardenswartz et al. | 705/26 |
| 2002/0046138 | A1 * | 4/2002 | Fitzpatrick et al. | 705/27 |
| 2004/0098317 | A1 * | 5/2004 | Postrel | 705/26 |
| 2005/0251440 | A1 * | 11/2005 | Bednarek | 705/10 |

FOREIGN PATENT DOCUMENTS

| | | |
|---|---|---|
| EP | 0978808 | 2/2000 |
| WO | 0041115 | 7/2000 |
| WO | 0041145 | 7/2000 |
| WO | 0102991 | 1/2001 |
| WO | 0118732 | 3/2001 |
| WO | 0127854 | 4/2001 |
| WO | 0131531 | 5/2001 |
| WO | 0140980 | 6/2001 |
| WO | 0145062 | 6/2001 |
| WO | 0150370 | 7/2001 |

OTHER PUBLICATIONS

Netcentives News dated May 18, 2000 and miscellaneous pages downloaded from the Netcentives website on Jun. 5, 2001.

The Loyalty and Frequency Marketing Quarterly Newsletter published by Frequency Marketing, Inc.; vol. 8, Issue 2, 2000 downloaded from the website on Jun. 15, 2001.

"Teeing Off at BC's Finest Golf Course is Rewarding," Ernex Marketing Technologies, Inc. News Release Dated Apr. 3, 2000.

Ulrich, Kent "Security is in the cards," *Canadian Retailer*, vol. 10, Issue 2, Mar./Apr. 2000.

Hu, Sheldon "Leverage technology to achieve your goals," *Marketing News*, vol. 34, p. 19, Feb. 14, 2000.

* cited by examiner

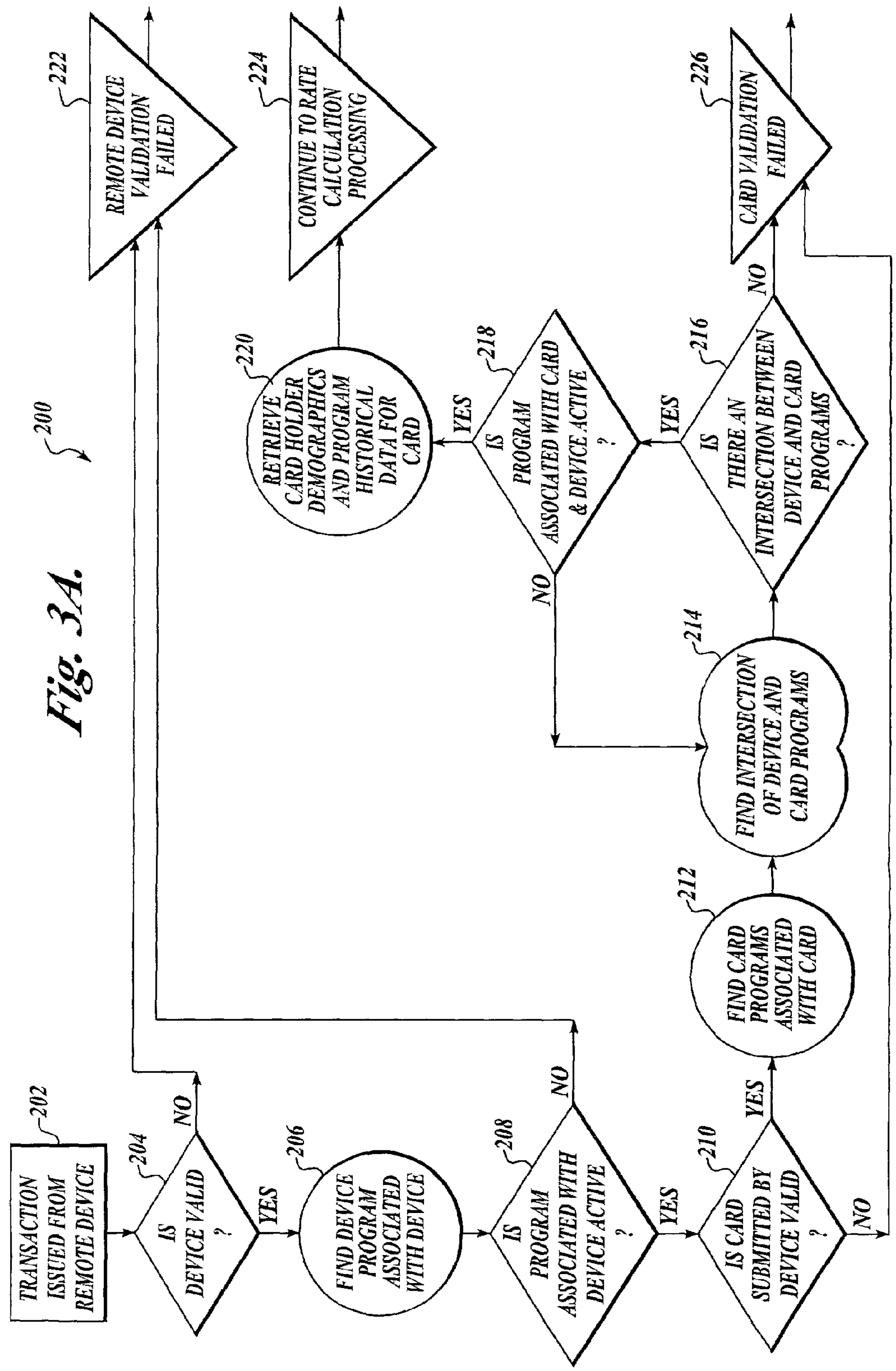

Fig. 3A.
200
202
TRANSACTION ISSUED FROM REMOTE DEVICE
204
IS DEVICE VALID ?
YES
NO
206
FIND DEVICE PROGRAM ASSOCIATED WITH DEVICE
208
IS PROGRAM ASSOCIATED WITH DEVICE ACTIVE ?
YES
NO
210
IS CARD SUBMITTED BY DEVICE VALID ?
YES
NO
212
FIND CARD PROGRAMS ASSOCIATED WITH CARD
214
FIND INTERSECTION OF DEVICE AND CARD PROGRAMS
216
IS THERE AN INTERSECTION BETWEEN DEVICE AND CARD PROGRAMS ?
YES
NO
218
IS PROGRAM ASSOCIATED WITH CARD & DEVICE ACTIVE ?
YES
NO
220
RETRIEVE CARD HOLDER DEMOGRAPHICS AND PROGRAM HISTORICAL DATA FOR CARD
222
REMOTE DEVICE VALIDATION FAILED
224
CONTINUE TO RATE CALCULATION PROCESSING
226
CARD VALIDATION FAILED

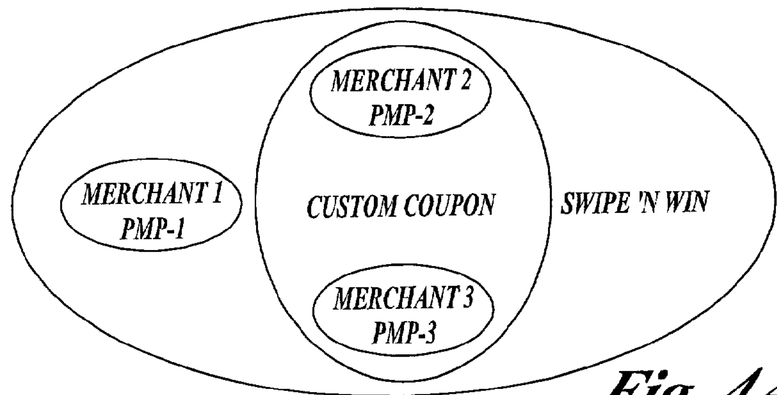
Fig. 4A.
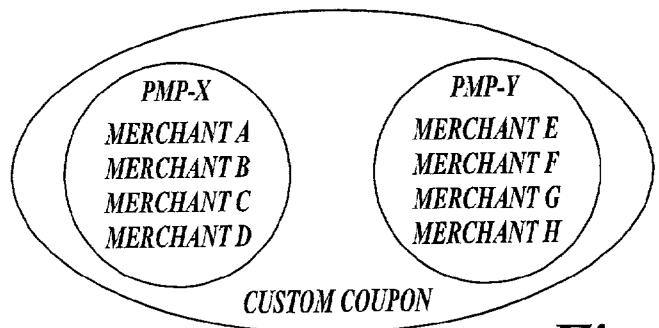
Fig. 4B.
CHAIN
MERCHANT 1
PMP-4
STORE 1
STORE 2
STORE 3
STORE ...
SWIPE 'N WIN
CUSTOM COUPON
Fig. 4C.

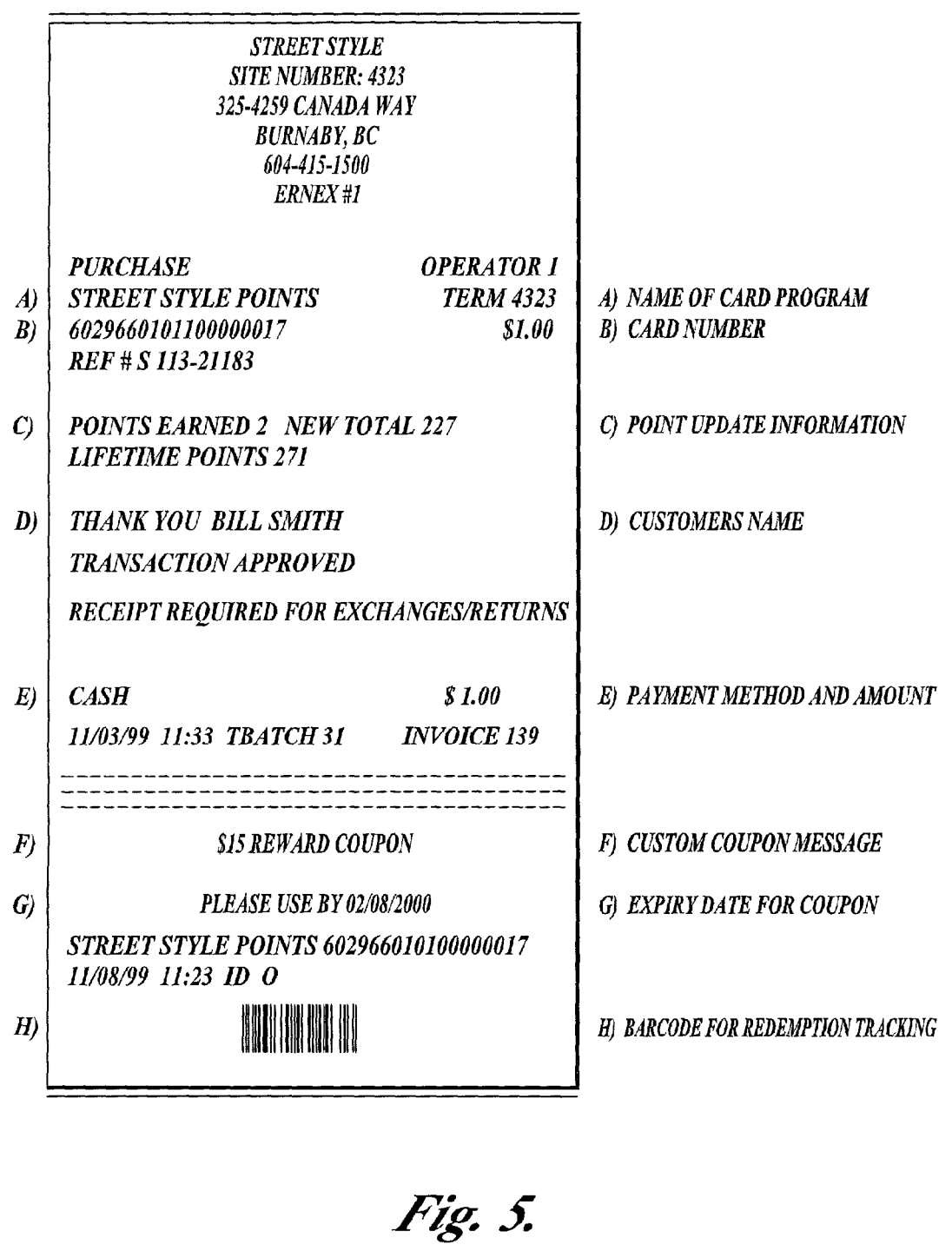

STREET STYLE
SITE NUMBER: 4323
325-4259 CANADA WAY
BURNABY, BC
604-415-1500
ERNEX #1

PURCHASE OPERATOR 1
A) STREET STYLE POINTS TERM 4323 — A) NAME OF CARD PROGRAM
B) 6029660101100000017 $1.00 — B) CARD NUMBER
REF # S 113-21183

C) POINTS EARNED 2 NEW TOTAL 227 — C) POINT UPDATE INFORMATION
LIFETIME POINTS 271

D) THANK YOU BILL SMITH — D) CUSTOMERS NAME
TRANSACTION APPROVED
RECEIPT REQUIRED FOR EXCHANGES/RETURNS

E) CASH $ 1.00 — E) PAYMENT METHOD AND AMOUNT
11/03/99 11:33 TBATCH 31 INVOICE 139

F) $15 REWARD COUPON — F) CUSTOM COUPON MESSAGE
G) PLEASE USE BY 02/08/2000 — G) EXPIRY DATE FOR COUPON
STREET STYLE POINTS 602966010100000017
11/08/99 11:23 ID O
H) [barcode] — H) BARCODE FOR REDEMPTION TRACKING

*Fig. 5.*

STREET STYLE
SITE NUMBER: 4323
325-4259 CANADA WAY
BURNABY, BC
604-415-1500
ERNEX #1

PURCHASE OPERATOR 1
A) STREET STYLE POINTS TERM 4323
B) 6029660101100000017 $1.00
REF # S 113-21183

C) POINTS EARNED 2 NEW TOTAL 227
LIFETIME POINTS 271

D) THANK YOU BILL SMITH
TRANSACTION APPROVED
RECEIPT REQUIRED FOR EXCHANGES/RETURNS

E) CASH $ 1.00
11/03/99 11:33 TBATCH 31 INVOICE 139

SWIPE 'N WIN VOUCHER
YOU ARE THE LUCKY WINNER OF
F) A SHOPPING SPREE WORTH $500!

STREET STYLE POINTS 6029660101000000017
11/08/99 11:23 PRIZE 213 REF # 21193

G) RECEIVED BY__________________
H) VOUCHER #__________________

A) NAME OF CARD PROGRAM
B) CARD NUMBER
C) POINT UPDATE INFORMATION
D) CUSTOMERS NAME
E) PAYMENT METHOD AND AMOUNT
F) CUSTOM PRIZE MESSAGE
G) EMPLOYEE NAME FOR TRACKING
H) TRACKING NUMBER

*Fig. 6.*

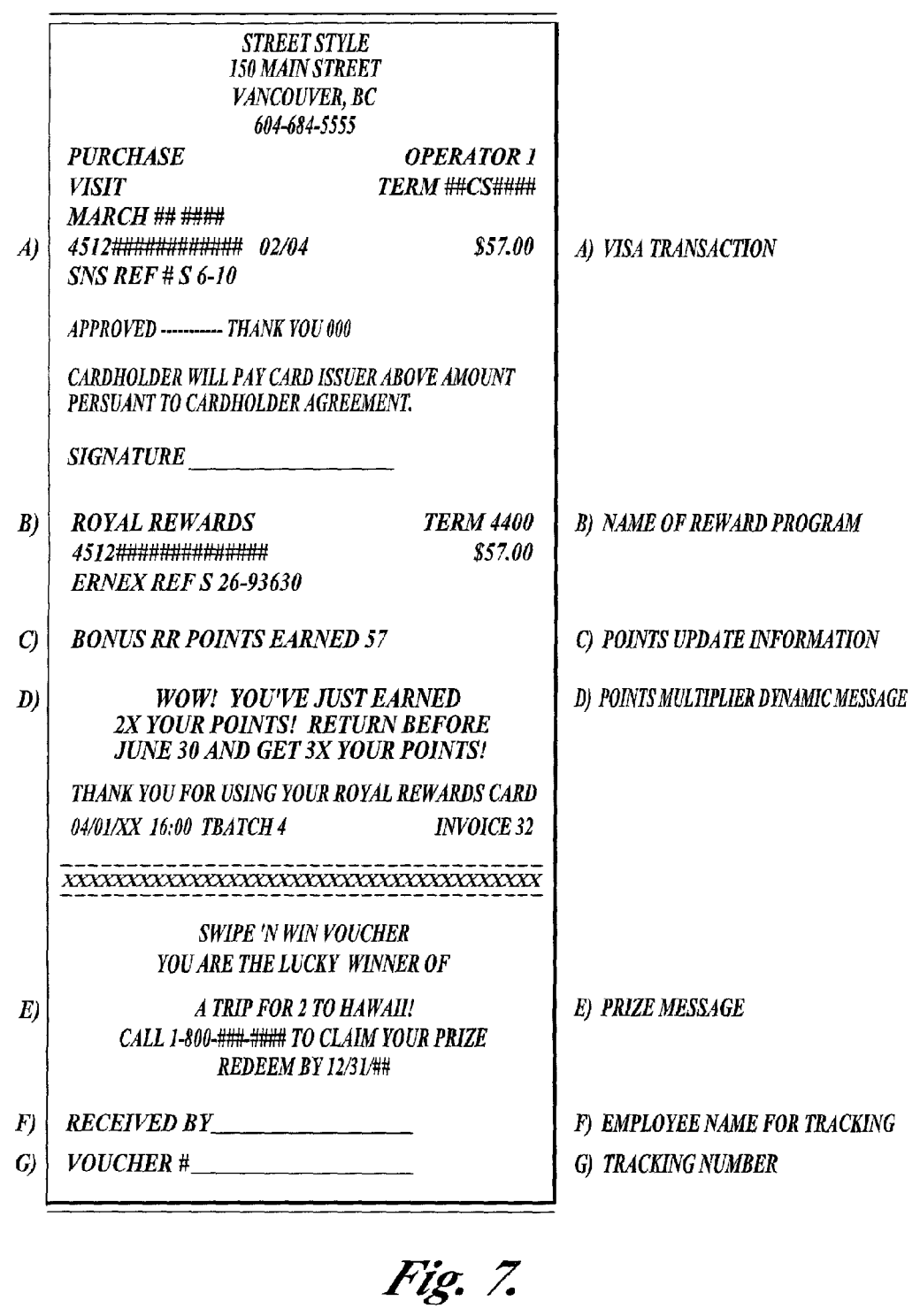

STREET STYLE
150 MAIN STREET
VANCOUVER, BC
604-684-5555

PURCHASE OPERATOR 1
VISIT TERM ##CS####
MARCH ## ####

A) 4512############ 02/04 $57.00
SNS REF # S 6-10

APPROVED ---------- THANK YOU 000

CARDHOLDER WILL PAY CARD ISSUER ABOVE AMOUNT PERSUANT TO CARDHOLDER AGREEMENT.

SIGNATURE ________________

B) ROYAL REWARDS TERM 4400
4512############## $57.00
ERNEX REF S 26-93630

C) BONUS RR POINTS EARNED 57

D) WOW! YOU'VE JUST EARNED
2X YOUR POINTS! RETURN BEFORE
JUNE 30 AND GET 3X YOUR POINTS!

THANK YOU FOR USING YOUR ROYAL REWARDS CARD
04/01/XX 16:00 TBATCH 4 INVOICE 32

XXXXXXXXXXXXXXXXXXXXXXXXXXXXXXXXXXXXXX

SWIPE 'N WIN VOUCHER
YOU ARE THE LUCKY WINNER OF

E) A TRIP FOR 2 TO HAWAII!
CALL 1-800-###-#### TO CLAIM YOUR PRIZE
REDEEM BY 12/31/##

F) RECEIVED BY________________

G) VOUCHER #________________

A) VISA TRANSACTION
B) NAME OF REWARD PROGRAM
C) POINTS UPDATE INFORMATION
D) POINTS MULTIPLIER DYNAMIC MESSAGE
E) PRIZE MESSAGE
F) EMPLOYEE NAME FOR TRACKING
G) TRACKING NUMBER

Fig. 7.

MARKETING SYSTEMS AND METHODS

CROSS-REFERENCE TO RELATED APPLICATIONS

This application claims priority under 35 U.S.C. 119(e) to U.S. patent application Ser. No. 60/227,150 filed Aug. 22, 2000 and U.S. patent application Ser. No. 60/229,626 filed Aug. 31, 2000.

BACKGROUND OF THE INVENTION

1. Technical Field of the Invention

The present invention relates to real-time, automated marketing programs implementing one or more program rules matrix modules that calculate benefits to customers based on one or more customer identifier(s), one or more merchant identifier(s) and one or more customer behavior(s). In one embodiment, program rules matrix modules implement Award Accelerator Programs (AAPs) that award benefits in an accelerated or decelerated fashion, based upon one or more qualifying customer identifier(s), merchant identifier(s), and customer behavior(s). Marketing programs are implemented using a host controller that communicates with a plurality of remote transaction systems to provide real-time, individualized, automated awards and sophisticated multi-variable analysis of transaction data. Another aspect of the present invention relates to systems and methods implementing a plurality of marketing programs, offered by a plurality of merchants or merchant groups, upon presentation of a qualifying identifier, such as a (single) transaction card. Yet another aspect of the present invention provides methods and systems enabling a "single-step" transaction, wherein data required to determine eligibility for a marketing program and data required to initiate payment processing is acquired in a single step, such as a single electronic reading of a transaction card.

2. Description of Prior Art

Incentive and loyalty programs have been developed as an integral feature of database marketing with the objective of increasing customer satisfaction and retention, and promoting repeat business. Businesses can deliver offers and rewards to the most appropriate customers and, in some instances, rewards may be credited and redeemed in real-time while customers are at the point-of-transaction. In general, loyalty marketing programs track the transactions of participating members at various individual merchants or at predetermined groups of merchants. When a participating member has satisfied certain criteria, such as attaining a certain number of purchases or dollar value of purchases, the member qualifies for an award, which typically involves redeeming accumulated points for purchase discounts or merchandise.

Various types of travel incentive programs are popular. In frequent flyer programs, for example, mileage points are awarded in relation to the mileage flown. Many airlines additionally have arrangements with other businesses, such as hotels, vehicle rental agencies, communications providers, credit institutions and the like, whereby mileage points are also awarded in relation to other business transactions. Typically, participants are provided with monthly statements apprising them of the updated status of their frequent flyer account. After the user has accumulated a predetermined number of mileage points, they may be redeemed for an award. Similarly, banking, credit and retail institutions have their own loyalty programs in which credit points are accumulated in relation to the dollar value of accumulated purchases. These types of programs generally require the use of a specialized loyalty card or another transaction card, such as a credit or debit card. The cardholder is periodically provided with an account statement and may be rewarded with redeemable credit in recognition of past transactions.

Most incentive or loyalty programs operate using batch processing systems and provide reports updating the award status on a periodic basis. More recently, real-time systems have been implemented. Real-time systems for loyalty programs generally involve retrieving customer or member information from a loyalty card, at a point of sale terminal, and conveying the customer identification and transaction information to a centralized database via phone lines or other high-speed networks. In real-time systems, the customer's shopping information is updated instantly, and updated point totals may be provided at the register. This process provides immediate feedback to the customer, indicating that the purchase is being rewarded, thereby encouraging and promoting future visits.

U.S. Pat. Nos. 5,774,870 and 6,009,412 disclose an integrated on-line frequency award program in which a user may access the program on-line, browse a product catalog, and electronically place an order. A program checks the user's credit and electronically issues a purchase order to the supplying company. A program calculates award points, updates the award account and communicates the number of awarded points to the user. Users may electronically redeem their reward by applying awarded points to items in an award catalog, wherein the program electronically places an award redemption order with the fulfillment house and updates the user's account.

U.S. Pat. No. 5,923,016 discloses a computer implemented consumer transaction point accumulation system in which a consumer earns and accumulates points for immediate use during transactions at participating retailer outlets. For every transaction, a customer's identification number is transmitted to a host database, which stores customer balances of points accumulated to date. The system is implemented locally at a point-of-transaction device and in an off-site and decentralized environment. Point accumulation cards are issued for customer identification, and optionally, the system may identify customers via credit cards to access a customer's loyalty account. As consumers make purchases, the system awards points in the form of redeemable coupons and/or gift certificates, preferably in real-time, which can be redeemed for reductions in purchase prices or other awards. Points are awarded in relation to dollar amount spent.

U.S. Pat. No. 6,014,635 describes a system in which cash discounts are awarded in real-time during credit card transactions. A unique membership identifier is used to process a discount transaction in parallel with the standard credit card authorization portion of a transaction.

U.S. Pat. No. 6,055,573 discloses an on-line method, system and computer product for delivering a targeted advertisement to a consumer based on the customer's offline purchase history. The targeted advertisement is then directed over a computer network to the individual consumer's personal computer. Additionally, the targeted advertisement may include a promotional incentive offering the consumer a reward for complying with a given type of behavior, such as a minimum number of purchases, and wherein the reward may be redeemed at a retail store.

U.S. Pat. No. 6,061,660 describes an incentive program and award system for using a computer network, preferably the Internet, to provide consumer access to expanded incentive programs using a conventional computer, to permit sponsors to build, buy, store, modify, offer, track and administer incentive programs and to permit sponsors and retailers to offer improved award fulfillment for participants in incentive programs.

U.S. Pat. No. 6,070,147 discloses methods and systems for administering a frequent buyer loyalty program wherein a frequent buyer redemption card consists of a government-issued identification card, such as a driver's license. Information derived from the government-issued identification card is used to access third party databases to gather further identification or demographic information about customers. Information derived from third party databases would be employed to implement a loyalty program.

In general, conventional marketing programs, and in particular loyalty programs, are simplistic in design and operation, taking into account only a small fraction of transaction, customer and merchant information in the design and implementation of award systems. For example, conventional loyalty marketing programs apply broad-based, one-dimensional rules equally to all customers. Rather than simply award benefits based on one or two simplistic criteria, such as dollar amount spent per transaction, or item purchased, the present invention provides marketing programs that are rich and complex in detail and diversity, permitting merchants to offer custom-designed marketing programs tailored toward influencing customer behavior. Determining what qualifying behavior is required of customers is dependent upon the particular marketing goals of each individual merchant. As a result, the present invention offers a nearly limitless variety of possible marketing programs. Systems and methods of the present invention also provide unique Award Accelerator Programs, which award benefits to customers in an accelerated or decelerated fashion, whereby benefits are different for successive transactions.

SUMMARY OF THE INVENTION

In one respect, the present invention relates to real-time, automated marketing methods and systems. According to one embodiment, marketing methods and systems implement one or more program rules matrix module(s) that determine benefit(s) to qualifying customers based upon one or more qualifying customer identifier(s), one or more qualifying merchant identifier(s), and one or more qualifying customer behavior (s). Marketing systems and methods of the present invention enable merchants to effectively target marketing, incentives and offers to create a more loyal and profitable customer base. Merchants may play an active role in designing marketing program rules matrix modules, including Award Accelerator Programs, to suit their unique customer base and marketing goals. Systems and methods of the present invention permit individual merchants and merchant group(s) to run one-to-one marketing programs between one or more selected merchant(s) and one or more selected customer(s) or customer group(s), at the point-of-transaction, with awards determined, credited, delivered and redeemed in real-time.

Value-added analysis of the collected data enables merchants to gain a better understanding of customer behavior and trends, and to identify customers based on behaviors. This information enables merchants to market and sell more profitably. The present invention provides systems and methods whereby customer, merchant and other databases are automatically updated with current data and information obtained from each transaction. Using real-time marketing systems and methods of the present invention, analysis of the collected data also permits merchants to dynamically alter and redesign marketing programs in real-time, and to modify marketing campaigns mid-stream, based on data received during the early stages of a marketing program.

Marketing systems and methods of the present invention are implemented using one or more host controller system(s) that communicate with a plurality of remote transaction systems. The host controller system(s) may comprise a centralized controller system operated, for example, by a marketing program administrator. Alternatively, controller systems may be distributed in a plurality of locations and linked using communications networks. During a transaction, one or more unique customer identifier(s) is acquired, such as by electronically scanning a transaction card; one or more unique merchant identifier(s) is acquired, such as from a point-of-transaction terminal; and transaction information is acquired, such as the amount of purchase, items purchased, etc. The customer and merchant identifiers, as well as transaction data, are transmitted to the host controller system. The host controller system receives information from remote systems and performs various validation procedures, such as identifying participating merchants or merchant groups or remote systems, and identifying customers, for participation in selected marketing programs.

Following validation, rate calculation processing is performed by analyzing customer, merchant, and transaction data according to one or more sets of marketing program matrix rules. Marketing program matrix rules modules may be specified and designed by individual merchants or merchant group(s), and targeted to specified customers, customer groups, and/or customer behaviors. The matrix rules modules may be organized in a hierarchical, nested, concentric or overlapping manner as applied to merchants, merchant groups, customers, and/or customer behaviors.

According to a preferred embodiment, at least one of the marketing program matrix rules modules incorporates an Award Accelerator Program (AAP) specifying that a successive qualifying behavior of specified qualifying users at one or more qualifying merchant(s) produces an award that is different from (more or less than) the previous award. Such programs may be implemented in a specified or unspecified time period. In one embodiment, benefits are awarded to customers in a successively accelerated fashion, based on one or more customer identifier(s), and one or more predetermined customer behavior(s), such as a shopping or purchasing behavior. In another embodiment, a premium award may be given based on a specified first qualifying behavior, such as a first purchase at a participating merchant or merchant group, with successive awards being decelerated compared to the first premium award. AAPs may accelerate or decelerate award benefits, for example, based on purchase frequency, purchase amount, particular items purchased, date and/or time of transaction, location of transaction, and the like, and/or based on customer identifier(s), including customer demographics, merchant identifier(s), including merchant demographic information, and the like. In yet another embodiment, successive awards may be accelerated or decelerated compared to the previous award based, for example, on the customer behavior(s), as specified by various merchants or merchant groups. Each Award Accelerator Program may be administered on behalf of a specific merchant or merchant group, or on behalf of a membership organization, financial institution, or the like. Multiple unrelated merchants, and multiple unrelated customers or customer groups, may participate in the same or multiple different Award Accelerator Programs.

Following rate calculation processing, the host system may incorporate an award prioritization system and/or integrate different and additional types of awards programs. If a customer qualifies for multiple awards during rate processing, for example, an award prioritization system that selects a single award, or that chooses multiple awards from among qualified awards, based on predetermined award priorities may be implemented. Additionally, the marketing program rules may be integrated with one or more different types of marketing programs, such as merchant loyalty program(s), association or coalition loyalty program(s), gift card program (s), custom coupon(s), instant prizes, and the like, as described in greater detail below. In a preferred real-time system implementation, information such as updated award information or customer information may be transmitted to the remote transaction system for delivery to the customer and/or the merchant. Information relating to updated award status may be delivered to the customer, for example, by printing on a transaction receipt. Information relating to the identity of the customer, previous transaction history of the customer, and the like, may be delivered to the merchant, for example, via a point of transaction display.

Systems of the present invention incorporate at least one transaction processing host controller linked, via one or more communications network(s), to a plurality of remote transaction systems. Marketing systems and methods of the present invention may be implemented using loyalty cards, credit or debit cards, radio frequency (rf) transmitters, retinal scans or finger prints, or any other type of system identifying a user based on one or more unique customer identifier(s) that can be transmitted to a host controller. Similarly, various remote point-of-transaction systems, such as various point-of-sale terminals, may be used to provide one or more unique merchant or merchant group identifier(s) that can be transmitted to a host controller. Various point-of-transaction systems may also be used to capture user behavior and transaction data such as purchase amount, items purchased, and the like. In one preferred embodiment, point-of-transaction systems incorporate merchant identifier(s) and other merchant information, read electronic data stored on a user or customer identification card such as a loyalty card, credit card, or the like to capture a user identifier, and acquire transaction data during transaction entry. In another preferred embodiment, the point of transaction system additionally acquires transaction payment data, such as a payment identifier that links the user to a payment instrument or arrangement.

In one aspect, a marketing system of the present invention is capable of receiving, analyzing, storing, updating, retrieving and transmitting data pertaining to one or more user(s), one or more merchant or merchant group accounts, and one or more customer behavior(s), preferably in real-time. One exemplary configuration for such a system incorporates a centralized host controller having one or more software module(s) functioning as a transaction processing engine integrated therein.

One or more database(s) for storing and updating merchant information, customer information and/or transaction information are operably linked to the host controller, and the host controller is linked to one or more program matrix rules module(s). Any aspect of the transaction, customer and/or merchant information may be compiled into one or more tables and stored in one or more databases. Examples of customer data categories stored in customer database(s), and for which rules may be designed, include, for example, customer identifier(s), name, gender, address (street, city, state, country, and the like), date of birth, loyalty affiliation, association and/or membership affiliation(s), credit or banking facility affiliation(s), credit and banking account identifiers, driver's license number, social security number, phone number, annual income, other demographic information, and the like. Examples of merchant data categories stored in merchant database(s) include, for example, merchant name, merchant identifying number, merchant type, merchant location, division within merchant location, point-of-transaction location and identifier, sales clerk identifier, and the like. Examples of transaction or user behavior identifier data include, for example, date, time, sales category or categories, transaction amount range, transaction amount, transaction type, individual products purchased and purchase prices, product and/or purchase classifications, products returned and amount of return(s), credits, and the like. Data is acquired, and stored and updated with data from each participating transaction, providing access to cumulative data, such as the number of transactions over time, the number and type of products purchased, purchased items and prices, date of and/or time since last purchase, customer purchase history, and the like, categorizable with respect to individual merchants and/or merchant groups, at any point in time.

The customer/merchant/transaction database(s) serve as the basis for implementing, optionally, one or more Award Accelerator Program(s) using program rules matrix modules. The program matrix rules module(s) may incorporate numerous independent program rules modules for implementation of numerous programs, specified by various merchants or merchant groups. Merchants and merchant groups may apply different program rules matrix modules to different categories of customers, based on one or more customer identifier (s), one or more customer demographic groups, or the like, and to different categories of transactions. Additional or different program matrix rules modules may be introduced and linked to the host controller and integrated with appropriate databases, as desired. Individual program rules matrix module(s) may be updated or modified, as desired, at any point prior to initiation of or during a marketing program At least one data management, storage and retrieval module may be linked to the host controller(s). The host controller (s) is also linked to one or more communications application (s), which communicate with a terminal handler linked to a plurality of remote systems, such as multi-media point-of-transaction terminals. The terminal handler effectively translates incoming and outgoing transmissions through a network interface from a plurality of remote transaction systems, such as multimedia terminals or point-of-transaction systems, which may be operably linked to one or more in-house computer systems. Additional modules may include one or more dynamic messaging systems, geographic information systems (GIS) applications and accounting applications, all operably coupled to the host controller.

In one aspect, methods and systems of the present invention involve one or more program matrix rules module(s) specifying one or more qualifying customer identifier(s), one or more qualifying merchant identifier(s), one or more qualifying customer behavior(s), which predetermine awards based on a combination of customer identifier(s), merchant identifier(s), behavior(s), etc. The program matrix rules modules specify a plurality of logic rules to validate transaction, customer and/or merchant data, and determine benefits accordingly. The host controller retrieves the required information from various databases, integrates the relevant qualifiers, identifications, transaction data, program matrix rules modules, etc., and enables sophisticated, multi-variable analysis and award determination.

Marketing methods and systems of the present invention are highly flexible and facilitate the design and implementation of custom-tailored program matrix rules modules, such as various Award Accelerator Programs, AAPs, and the like, for individual merchants and merchant groups. While accelerator programs are a preferred type of marketing program implemented using methods and systems of the present invention, other types of marketing programs may be implemented using various program matrix rules modules.

Merchants may implement custom-designed AAPs for specified qualifying individual(s) and/or select qualifying groups of individuals. Furthermore, AAPs may be created for a group or coalition of merchants that may share one or more AAPs. In general, the characteristic feature of AAPs, compared to other types of marketing programs, is that AAPs calculate and award benefits such that successive qualifying behaviors of specified qualifying users at one or more qualifying merchants over a time period produces successively different awards. Each successive award over a timer period may be increased (accelerated), or decreased (decelerated), in comparison to the previous award. The AAP may even be designed such that successive awards are randomly increased or decreased on comparison to the previous award within a predetermined range. And, the time period over which any particular AAP is implemented, may vary as desired.

Qualifying behavior(s), as used herein, may be any action on the part of a user that satisfies criteria established by the merchant(s) and implemented in a program rules matrix module. Qualifying behaviors may include, for example, one or more visit(s) to a merchant, one or more response(s) to a merchant, participation in one or more merchant program(s), one or more purchase(s) from a merchant, one or more purchase(s) of specified goods from a merchant, one or more purchases of specified value(s) from a merchant, and the like. Qualifying behaviors may also include any number of combinations of these and other behaviors. In an Award Accelerator Program, each successive action satisfying established qualifying behavior criteria, at one or more merchants, over a time period, changes the user's benefit compared to the previous benefit by a factor of more or less than one.

For example, in one embodiment wherein the benefit comprises points, an AAP may provide that a first customer behavior (e.g., purchase) of a special type or level earns the user a first level of points, the second customer behavior (e.g., purchase) of a specified type or level earns a second level of points that is greater than the first level, and a third customer behavior (e.g., purchase) of a specified type or level earns a third level of points that is greater than the second level, etc. The customer behavior that qualifies for awards may be any preselected customer behavior including, for example, a purchase, a visit to a qualified merchant or a merchant in a qualified group, a purchase of a specified product or a specified product in a product group, a transaction of a preselected value, and the like. Qualifying customer behaviors may be changed periodically, or in relation to qualifying customers or qualifying merchants. Qualifying customer behaviors, such as purchases, may be cumulative in relation to benefit awards. In the embodiment illustrated above, an AAP serves as a frequency incentive to a participating customer by providing increasing (accelerating) benefits for successive qualifying behaviors. Other types of incentives may similarly be implemented in other types of marketing programs. Programs in which successive awards are reduced compared to each previous award may be implemented to motivate new customers to patronize specific merchants and/or merchant groups. Programs in which successive awards are different from the previous award—either increased or reduced—tend to stimulate customer participation and promote successive qualifying behaviors.

Marketing methods and systems of the present invention enable individual merchants to implement marketing programs suited to their needs, accommodating their customers and serving their sales goals. For example, a merchant may apply a set of rules embodied in a program rules matrix module whereby customers earn accelerated benefits if specified goods and/or services are bought or if purchases are made during a specified period, or even on a particular day of the week. Additionally, the present invention enables merchant groups, such as a chain of stores, or merchants located in a certain geographical area or distributing certain types of goods, to apply a custom set of rules that unites the merchants in a coordinated marketing program. Still further, groups of independent merchants may form one or more coalitions and apply yet another set of custom rules for administering a coalition marketing program.

In yet another aspect, marketing methods and systems of the present invention provide implementation of multiple marketing programs, involving multiple merchants and/or merchant groups, upon recognition and validation of one or more unique customer identifier(s). This feature provides, for example, implementation of marketing programs specific to individual merchants and/or merchant groups through existing customer identifier(s), such as those encoded electronically in existing credit cards, debit cards, loyalty cards, and the like, without requiring specialized customer identifier(s) or specialized cards. In an exemplary embodiment, marketing programs may be implemented using any type of unique customer identifier(s) provided as part of a transaction card that may additionally have conventional credit or debit accounts associated with it.

Any system that provides a unique customer identifier, including existing loyalty cards, credit and debit cards, service cards, association cards, membership cards for clubs, groups, organizations, and the like, or other unique identifiers such as finger prints, retinal scans, rf signals, optical or digital or electronic signals, or the like. Multiple marketing programs, such as multiple AAPs, and/or other marketing programs, such as other loyalty programs, gift card programs, custom coupons, instant prizes, and the like may be administered using a single customer identifier.

In another aspect, methods and systems of the present invention carry out multiple functions using a "single-step" transaction. Many existing marketing programs involve multiple transactions requiring multiple steps and recognition, for example, of one or more identifiers, such as one or more coded cards. Many transactions require one recognition, or card swipe, to acquire a customer and/or account identifier for a payment transaction such as a credit or debit transaction, and a second recognition, or card swipe, often with a different card, to initiate participation in a marketing program. According to methods and systems of the present invention, a customer identifier and at least one transaction payment identifier are acquired in a single step, such as a single examination of an identifying object. In one embodiment, a customer identifier and a transaction payment identifier, such as a credit or debit account identifier, are transmitted to the marketing host controller of the present invention, where the customer identifier is validated and rate calculation and benefit award is conducted, while transaction payment identifier is transmitted to the appropriate financial institution or intermediate processor, or to another institution for processing. In another embodiment, the customer identifier and transaction payment identifier are separated at the remote transaction system, such as a point-of-transaction terminal, and transmitted directly to the appropriate host for processing. In a preferred embodiment, transaction payment identifier data is transmitted to the appropriate financial or other institution for processing, and customer identifier and user behavior identifier data are transmitted to the marketing program host controller to determine eligibility for participation in a marketing program following validation and approval of the financial transaction. Acquiring data required for both a marketing program and the transaction payment in a single step, such as a single examination of an identifying object (e.g., card swipe), is convenient for the user, the merchant(s), and the payment processor.

The currency of the awards is generally points, but may be any currency of value, including monetary currency, credit for participating merchants, points or similar "created" currency, and the like. In some embodiments, the currency of the award program may be convertible to other currencies, and other currencies may similarly be convertible to the currency of the award program This permits, for example, the conversion of currency from other awards programs, e.g. airline points or miles, to be converted to the currency of award programs of the present invention, and vice versa. In this situation, for example, airline miles may be converted to awards points that may be redeemed to purchase groceries, movie tickets, electronics, and other goods from participating merchants or merchant groups. An additional feature of the marketing methods and systems of the present invention thus provides for conversion of outstanding award currencies from other programs into the currency of the program, generally points, and the redemption of the converted currency in the currency of the program.

Methods and systems of the present invention also provide for redemption of awards (in any currency, including gift certificates) at a point of transaction through the host controller system. In one embodiment, following acquisition of a user identifier, a merchant identifier and a redemption inquiry and communication of those identifiers to the host controller system over a communications network, the award balance associated with the user identifier is accessed, the eligibility of the merchant for redemption of the award is validated, and a rate calculation processing step determines whether a user award balance satisfies the redemption request. The redemption status is then communicated to the user and/or the merchant at the point of transaction, and an award balance associated with the user identifier may be updated to reflect the award redemption. An updated award balance may also be communicated to the point of transaction.

Additionally, gift certificates may be issued in the currency or currencies of awards programs of the present invention, and may be redeemable, in whole in incrementally, at participating merchants and/or merchant groups. A gift certificate or point award may be issued at a point of sale device, for example, when a customer or a gift or award recipient presents a unique identifier. Data relating to the unique gift or award recipient identifier, and the type or amount of the gift or award, is communicated to and stored at the host controller system. Any type of unique gift or award recipient identifier may be used, including an existing loyalty card, a debit or credit card, an association card, or the like. The gift or award may then be redeemed at any participating merchant, and redemption of the gift or award is communicated to and stored by the host controller system using, for example, a point of transaction device from the redeeming merchant.

Marketing methods and systems of the present invention preferably operate in real-time to provide award information to qualifying customers while they are at the remote transaction system. Alternatively, marketing methods and systems may operate in a batch processing mode in which award processing and/or award delivery is not accomplished on a real-time basis but, rather, award information and redemption opportunities are communicated to qualifying users on a periodic basis.

Marketing systems and methods of the present invention may further provide a statement incorporating a dynamic messaging system, such as dynamic custom messaging, to participants in real time at the point-of-transaction. Dynamic messaging systems inform the participant of the status of their marketing program account, preferably in real-time. Dynamic messaging systems may inform a participant of the award based on a current transaction, the cumulative total award balance for the customer, eligibility for and the specifics of future awards, and the like. In a related aspect, dynamic messaging systems may advise participants of general promotions offered by a particular merchant at the point-of-transaction, or may offer an individualized promotion, based on that particular participant's consumer profile history. Dynamic messages may be relayed to participants, for example, by printing messages on transaction receipts.

In another aspect, the present invention provides marketing programs such as AAPs implemented in conjunction with one or more custom coupon campaigns, which involve one or more offers marketed directly to customers, preferably in real-time at the point of sale, in a personal and customized manner. Merchants may selectively target customers or groups of customers based on any measurable criteria, or qualifying behavior, and offer a benefit in the form of a custom coupon issued through another marketing program, such as an AAP account. Coupon redemption may in turn be tracked, allowing merchants to measure the success of the campaign.

In yet another aspect of the present invention, the inventive systems and methods provide a "Swipe 'N Win" sweepstakes program coupled with one or more marketing programs such as AAPs. Preferred embodiments may provide notification of instant winners in real-time through dynamic messaging via the instant statement issued at the point-of-transaction.

In yet other aspects, systems and methods of the present invention provide a revenue model for marketing programs and, in particular, Award Accelerator Programs. In preferred embodiments, participating merchants pay a negotiated percentage of each customer transaction associated with an AAP. According to a preferred revenue model of the present invention, successive customer participations in a merchant or merchant group marketing program such as an AAP, increase, or reduce, the negotiated percentage of successive customer transactions by a factor of more, or less, than one, respectively. For each successive qualifying behavior, such as a customer purchase, the participating merchant pays an incrementally different fee to the marketing program administrator. The fee may be a flat fee per transaction for example, or the fee may accrue as a percentage of transaction value. For example, a first qualifying purchase may incur a merchant participation fee of 10% of transaction value, a second qualifying customer purchase may incur a merchant participation fee of 11%, a third qualifying customer purchase may incur a merchant participation fee of 12%, and so on. Similarly, a first purchase may incur a merchant participation fee of 10%, a second qualifying purchase may incur a merchant participation fee of 8%, a third qualifying customer purchase may incur a merchant participation fee of 7.5%, and so on. In a program in which awards are successively different and both increase and decrease over successive qualifying behaviors, the merchant participation fee may likewise be successively different, with both increases and decreases resulting from successive qualifying behaviors.

In further aspects, the systems and methods of the present invention provide database analysis to provide detailed buying profiles for individual customers and groups of customers, and to provide information to merchants regarding their customer base. The present invention provides this service by acquiring, storing, analyzing and reporting metrics such as the average number of purchases, average purchase size and frequency of purchase by individual customer and various customer demographics, such as geography and time. Reports may be tailored to the specific requirements of individual merchants, and may include performance of the merchant's top customers and responses to specific promotions. In related aspects, the present invention may provide reports in electronic format, including HTML and XML formats, which may be accessible to customers through a personalized Web portal. Merchants may access Multidimensional Online Analytical Processing data modules to explore and analyze various information concerning consumer parameters.

In yet another aspect, marketing systems and methods of the present invention may be implemented as one or more stand-alone software program(s). Systems and methods of the present invention may be presented as a turn-key package for integration into a plurality of individual systems. One embodiment of the present invention provides a plurality of stand-alone systems in communication with one another to allow individual program participants to migrate between one or more merchant marketing programs.

BRIEF DESCRIPTION OF THE DRAWINGS

FIGS. 3A-3C show schematic flow charts illustrating one implementation of methods and systems of the present invention.

FIGS. 4A-4C show a schematic illustration of various configurations of Award Accelerator Programs (AAPs) alone and/or in conjunction with other marketing programs.

FIG. 5 shows one embodiment of a statement, integrated with a receipt, integrating a custom coupon.

FIG. 6 shows another embodiment of a statement, integrated with a receipt, providing a Swipe 'N Win voucher.

FIG. 7 shows another embodiment of a statement, integrated with a receipt and a payment agreement, illustrating participation in an Award Accelerator Program.

DETAILED DESCRIPTION OF THE INVENTION

While the invention may be susceptible to embodiment in different forms, the specific embodiments shown in the figures and described herein are presented with the understanding that the description of various embodiments is to be considered exemplary of the principles of the invention, and is not intended to limit the invention to that illustrated and described herein. The terms "customer" and "user" are used interchangeably, although a "user" is not required to be a "customer," in that users of marketing programs of the present invention need not necessarily make purchases to qualify for participation in the marketing programs.

Figure 1:
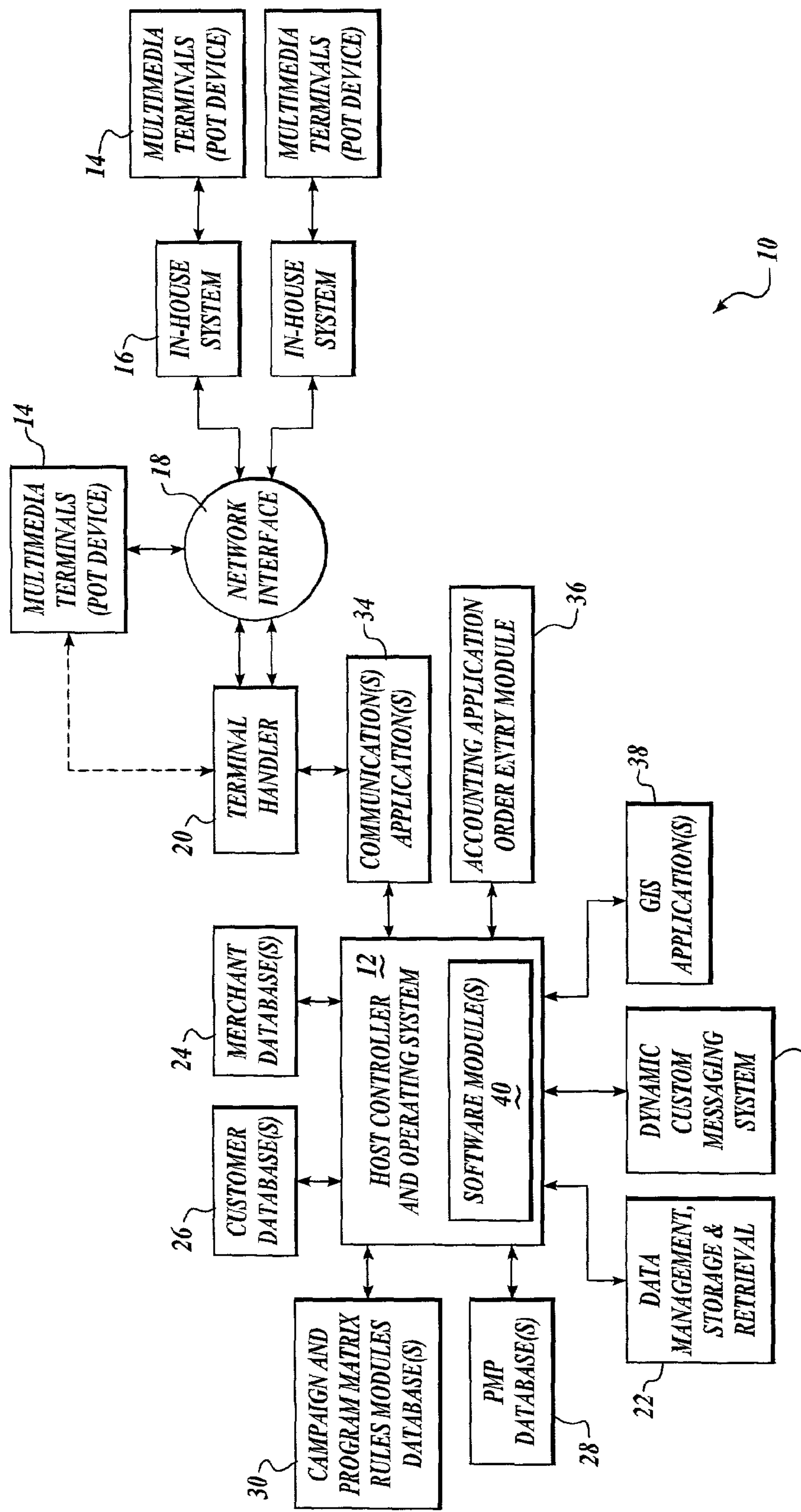
FIG. 1 shows a schematic diagram illustrating various aspects of a marketing system for implementing the marketing methods of the present invention.

FIG. 1 shows a highly schematic diagram of the primary elements of the system architecture. System 10 comprises a plurality of remote transaction systems, such as multimedia terminals 14 for inputting customer and/or merchant and/or transaction information. Suitable remote transaction systems include conventional point-of-transaction (POT) devices, such as point of sale terminals typically found in merchants' establishments, personal computers, personal communications devices such as digital assistants, phones, pagers, and the like. Point-of-transaction devices may further include any electronic registers, optical and magnetic scanners and readers, barcode scanners, magnetic strip scanners, any transaction card reader, as well as any necessary input data pads, and the like. Transaction devices 14 facilitate communication, preferably in real-time, to and from the host controller system. POT devices generally facilitate data entry, capture, storage and analysis, as well as transmission to a networked computer. In addition, POT devices preferably have the capacity to present information to the customer, such as generating printed receipts having custom messages, and/or through user interface display devices, such as personal computers.

Generally speaking, POT devices, alone or in combination with one or more in-house computer systems, may comprise at least one central processing unit(s) operably connected to one or more mass data storage units and at least one communications system operably coupled to central processor. One or more data input devices are electronically coupled to central processor unit(s), mass data storage unit(s) and communication system(s). For simplicity and clarity, only a limited number of such remote multimedia terminals or POT devices are illustrated, although it is understood that an unlimited number of remote multimedia terminals, and therefore merchants, and/or merchant groups may access the system. A POT device 14 captures transaction data relating to a customer's transaction, as well as one or more customer identifier(s), such as a transaction card number, Points Multiplier Program identification number(s), any conventional identification number, barcode, fingerprint, retinal scan, microchip output, and the like. Transaction and customer identification data may optionally be transmitted, by any conventional methods, to a merchant in-house operating system 16 where data may be stored and analyzed. In alternative embodiments, POT devices 14 are linked directly to one or more network interfaces 18. Methods and systems of the present invention may be implemented in any suitable networked environment.

In certain embodiments, in-house system 16 is operably coupled to one or more network interfaces, whereby transaction and customer identification data are effectively transmitted, via any suitable data transmission medium, to at least one terminal handler, or translator 20. In alternative embodiments, multimedia terminal/POT devices may be directly linked with one or more network interfaces. Data may be transmitted via local or regional phone lines, dedicated data transmission lines, cable, cellular, Personal Communication Systems, microwave, fiberoptic, global communications networks (such as the Internet) or satellite networks.

Terminal handler 20 receives transmissions from outside sources, translates and directs them to the one or more host central controller(s) 12, and associated sub-systems, and translates outgoing messages into formats compatible with the POT device which sent the original inquiry. Terminal handler 20 may be any interface controller device for facilitating communication with outside systems through various networks. In particular, terminal handler 20 facilitates communication between host central controller and a plurality of POT devices, either directly or indirectly through one or more networks. Terminal handler 20 is capable of holding numerous cardholder and merchant data packets simultaneously and is readily scalable. Methods and systems of the present invention are designed to operably communicate with any number of remote sites connected to one or more networks and accommodate any conventional communication technologies such as, but not limited to, Datapac 3101 Public Dial Port, Datapac 3201, LaserNet Plus, X.25, Frame Relay, XML, TCP/IP and the like.

Terminal handler 20 is electronically linked to one or more host central controller(s) 12, typically via one or more communication applications 34. Host central controller 12 generally comprise, but is not necessarily restricted to, at least one operably connected central processing unit, cryptographic processor, RAM, ROM, clock, operating system, data storage device, various input/output and interface input/output devices, and the like. Any conventional computer, personal computer and/or computer workstation with sufficient memory and processing capability may be used as a host controller. Operably integrated with host controller(s) 12 are one or more central processing software modules 40, which enable the systems and methods of the present invention to perform transaction processing, as well as a plurality of other functions. Host controller(s) 12 may operate using various system architectures using conventional hardware. In one embodiment, host controller 12 comprises an Intel-based server capable of running Microsoft Windows NT. Specific hardware requirements are a function of the transaction volume and the performance and reliability requirements of the various programs.

In alternative embodiments of the present invention, host central controller(s) 12 may be provided as a distributed host server rather than a centralized host server. For example, a plurality of individual systems from one or more merchants are operably linked so as to act as a single server for implementing the methods and systems of the present invention. Each individual system may host the transaction processing software module(s) 40 of the present invention. In alternative embodiments, point-of-transaction devices or smartcards may host the transaction processing software module(s) 40.

Host controller 12 in combination with processing software module(s) 40 enable a number of application processes to be executed, and is operably connected to at least one data management, storage and retrieval application 22, which is further interconnected to any number of mass storage devices and/or databases. Mass storage devices and/or databases 24, 26, 28, 30 may be of any conventional type, including, but not limited to, hard disk magnetic or optical storage units, CD-ROM drives or flash memory. Data management, storage and retrieval application 22, in conjunction with mass storage devices and/or databases 24, 26, 28, 30, organize and store necessary data and information. For the purposes of illustration, at least one merchant 24 and customer databases 26 are in communication with host central controller 12 and other components. It is understood that merchant, customer and other databases may be integrated into one or more large mass storage device or database rather than individual databases.

At least one campaign and program rules matrix module(s) and/or database(s) 30 is operably connected with host central controller 12. The program rules matrix modules specify various configurable rules to transactions and determine what benefit or benefits to deliver to the customer. Additionally, at least one AAP campaign module and/or database 28 is operably interconnected with host central controller 12, as well as other modules and databases. In alternative embodiments, one or more AAP campaign module and/or database(s) 28 may be integrated into campaign and program rules matrix module(s) and/or database(s) 30.

One or more communications application(s) 34 are operably connected to central controller 12, as well as any other appropriate applications to facilitate data transfer to and from various remote multimedia terminals 14. It is understood that any necessary input/output interface devices for receiving and transmitting information are also included in the system. As described above, customer, merchant and transaction data are transmitted from POT device(s) 14 to host controller(s) 12. During and/or following transaction processing, one or more data management, storage and retrieval module(s) 22, in conjunction with processing software modules 40, automatically updates one or more mass storage devices and/or databases 24, 26, 28, 30 with current information obtained from each transaction. Preferred embodiments of the present invention operate in real-time and therefore databases associated with customer, merchant and transaction data are updated in real-time.

At least one accounting application 36 may be operably connected to host controller 12 to receive, process and transmit billing information. The present invention may operate under a variety of revenue regimes well known in the art, but preferably includes the present invention's escalating revenue model for marketing, accelerator and/or Points Multiplier Programs. Additional applications may be employed, as necessary, such as a GIS (Geographic Information System) application 38 for collecting, manipulating, analyzing and displaying data in a geographical context.

One of skill in the art would readily appreciate that the inventive system may include any number of other applications, as well as one or more of the following system units, or comparable units well known in the art: subsystems coupled to the databases for processing data; controllers for regulating correspondence between input data from the multimedia terminals and output from one or more subsystems; local storage and retrieval modules to communicate with multimedia terminals; primary index managers; a plurality of extended storage and retrieval modules; one or more data sequencing interface units; one or more data delivery systems, and the like.

In alternative embodiments of the present invention, host central controller and associated communication applications are operably connected to a global communications network, e.g., the Internet and comprises at least one Website or Web server. A global communications network allows host system to send graphical Web pages, as well as other information, to a vast number of remote computer systems. A user may access the inventive Website by specifying a unique URL, typically in the form of an HTTP request. The host controller system acts as a Web server to receive requests and forward a Web page to the remote computer system's browser, which in turn displays any number of Web pages on the remote computer's system.

In operation, one or more merchants are enrolled in one or several distinct marketing program(s), preferably including one or more Award Accelerator Programs (AAPs), either as a separate marketing program or in the context of other programs. A merchant may be any individual, business concern, corporation, partnership, institution or the like, that offers goods and/or services to third parties. Customers participate in one or more marketing programs, such as AAPs, offered by individual merchants or merchant groups, financial institutions and/or other organizations based upon predetermined eligibility criteria. Customers include individuals, groups or juristic entities to whom merchant market their goods and/or services. In certain embodiments, the terms customers and cardholders may be used interchangeably.

Customers initiate participation in systems and methods of the present invention through one or more transactions at participating merchants. Point-of-transaction devices located in a multitude of businesses initiate communication of customer transactions to the host system for processing. Upon receipt of customer, merchant and transaction data, the host controller applies various configurable rules to the transaction data and determines what benefit or benefits to deliver to the customer in relation to the particular merchant. Award information and updates are returned to the point-of-transaction device, which communicates the benefit to the consumer. In preferred embodiments, all communications between the point-of-transaction device and the host controller are conducted in real-time.

Figure 2:
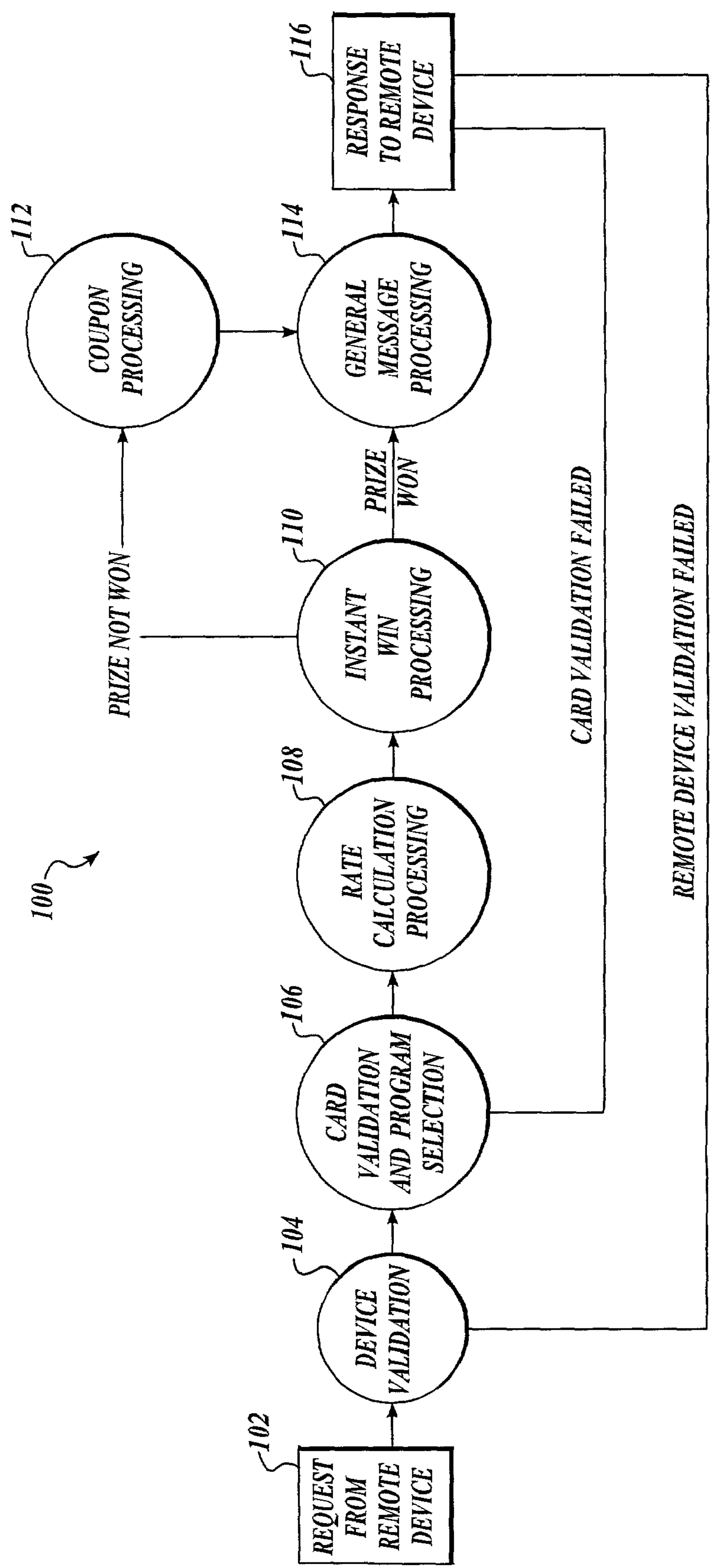
FIG. 2 shows a simplified flow diagram illustrating a simplified embodiment of marketing methods of the present invention.

FIG. 2 shows a simplified flow chart 100 for implementing the marketing systems and methods of the present invention. During a transaction, a request 102 is transmitted from a remote point-of-transaction device (POT). A request, as used herein, may include the transmission of one or more customer identifier(s), one or more merchant identifier(s), transaction data, as well as any information necessary to facilitate connection and communication with host central processing system. Customers are preferably identified by the centralized processing system through one or more identifiers, which may be of any conventional sort, including, but not limited to at least one marketing program identification code, AAP identification code, transaction card number, membership card number, barcode, fingerprint, retinal scan, microchip output, and the like. In preferred embodiments, one or more transaction cards may be employed. As used herein, a transaction card may be a credit card, debit card or any form of a commerce-related card, as well as a membership card in any organization, group, club, coalition and the like. Similarly, merchant identifiers may comprise any conventional identifier, including one or more numbers, codes, fingerprints, retinal scans, microchip output, and the like.

In preferred embodiments, customer related data and/or other information is acquired from a customer's transaction card, or other customer identifier, in conjunction with transaction-related data. Data is transmitted to the host controller, either through a direct link with a network interface or indirectly through an in-house operating system. Required communications links may be through any conventional communication interface technology, such as local or regional phone lines, dedicated data transmission lines, cable, cellular, Personal Communication Systems, microwave, fiberoptic or satellite networks. Host central processing system may be connected into several public packet data networks including, but not limited to Datapac 3101 Public Dial Port, Datapac 3201, LaserNet Plus, X.25 virtual circuit (Datapac 3000), TCP/IP and the like. Since most public data networks are interconnected, host central processing system is capable of receiving data from almost anywhere.

POT devices may have the capacity for providing operator-use prompts, performing data capture, data storage, receipt generation, and data transmission to a networked computer. In certain embodiments, one or more POT devices may undergo a terminal initialization, which registers a merchant's chosen password. Merchant password data may be sent to the system's host controller with each transaction. Merchant passwords may serve as a security mechanism to limit access to host system. A communication link is established whereby POT device may communicate with one or more terminal handler or translator, which may serve as a data packet assembler and disassembler and perform protocol conversions. A POT terminal transmits a request for information and, if necessary, is capable of waiting for a response from host system.

Methods and systems of the present invention may be configured in various ways, such as, but not limited to, one or more Marketing Terminals located at the POT device, one or more third party terminals operably coupled to the host controller, and/or one or more third party host-to-host communication networks. The latter option permits merchants to use their existing POT devices/in-house computer system/network infrastructure in conjunction with one or more communication components to link directly with the present invention. The merchants' POT devices communicate with in-house systems, which in turn, communicate with the inventive system. Additional embodiments of the present invention may provide Interactive Voice Response (IVR). The IVR system allows merchants and customers to complete transactions and access information stored on the inventive system via telephone, or similar technology. IVR systems provide a backup system in the event POT devices are down, or, in general, as an alternative to POT device.

In preferred embodiments, transactions are processed online. To accommodate instances when communication with host system is not possible, host system provides for a class of transactions referred to as "store and forward transactions." If a POT device attempts to communicate with host system is unsuccessful, the POT device may continue as if the transaction was completed. POT device preferably stores, or employs an in-house operating system to store, the transaction and forward it to host system. The stored transactions may be forwarded to host system in a subsequent data batch.

Following receipt of one or more requests, at least one device validation module 104 is activated. Should the remote POT device fail validation, an appropriate response is transmitted to the original POT device 116. Alternatively, upon validation of the POT device, one or more customer identifier validation modules and program selection module(s) 106 are engaged. In instances where customer identifiers are not recognized by the host controller as being valid, a suitable response is transmitted to the original POT device 116. Upon completion of customer validation and program selection 106, one or more rate calculation modules 108 are activated, wherein matrix rules modules are applied to one or more databases to determine what benefit is to be awarded. Further processing continues with the optional engagement of one or more Swipe 'N Win processing module 110 to determine whether an additional benefit is to be awarded. If a Swipe 'N Win prize is to be awarded, this information is forwarded to one or more general processing modules 114. In instances where a prize is not awarded, one or more custom coupon processing modules 112 are engaged. Subsequent results are, in turn, forwarded to one or more general processing modules 114, which prepare a statement of the customers' account, as well as provide information concerning any prizes and/or custom coupons awarded. The information is packeted, translated and transmitted to the original POT device 116. Customer, merchant and transaction data generated from customer transactions are stored on one or more databases. Preferred embodiments of the present invention operate in real-time, and therefore one or more databases of the present invention are updated in real-time.

FIG. 3A shows a detailed schematic flow chart 200 of device validation 104, customer/card validation and program selection 106. Requests are processed through at least one terminal handler or translator 202, which converts data stream transmitted from remote POT devices and into information analyzable by various processing modules, as well as other subassemblies of host central processing system. As previously mentioned, one or more device validation modules 204 validate remote POT device, and if approved, processing routine(s) determine one or more merchant program(s) associated with the remote POT device. These processes may be facilitated by employing one or more merchant identifiers. Additional information pertaining to the merchant may be acquired at the POT device, such as, but not limited to, merchant location, specific POT device within a merchant's establishment, employee identifier, and the like.

Additional processing routines determine whether merchant program(s)associated with the original POT device are currently active 208. If so, one or more processing module(s) determine whether a customer's transaction card, or other identifier, is valid 210. If valid, further processing modules 212 search various databases to locate one or more programs, preferably one or more Points Multiplier Programs, associated with the customers' transaction card(s), or other customer identifier(s).

Specialized software modules 214, 216 search one or more databases to ascertain intersections between merchant program(s) and customer identifier(s). If an intersection is found, software routine(s) 218 determine whether one or more merchant program(s) associated with the customer identifier are active. If an intersection is not found, this information is relayed to a subroutine that forwards a message to the original POT device that card validation has failed 226. If the merchant program(s) associated with the customer identifier(s) are determined to be active, one or more software modules 220 retrieve customer information from one or more databases, including such information as demographic and longitudinal program information. This information is relayed to rate calculation module(s) 224.

Figure 3B:
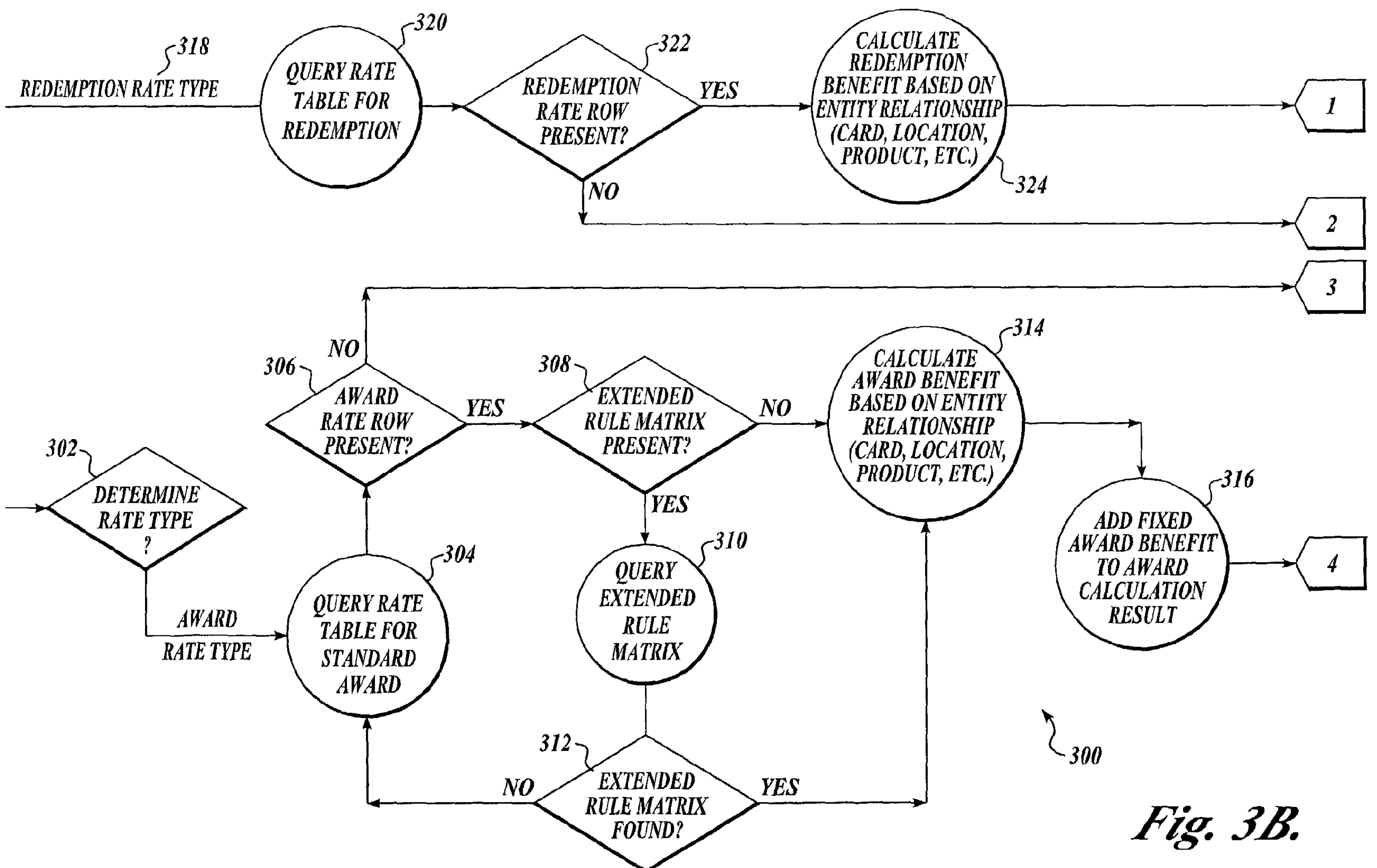
Figure 3C:
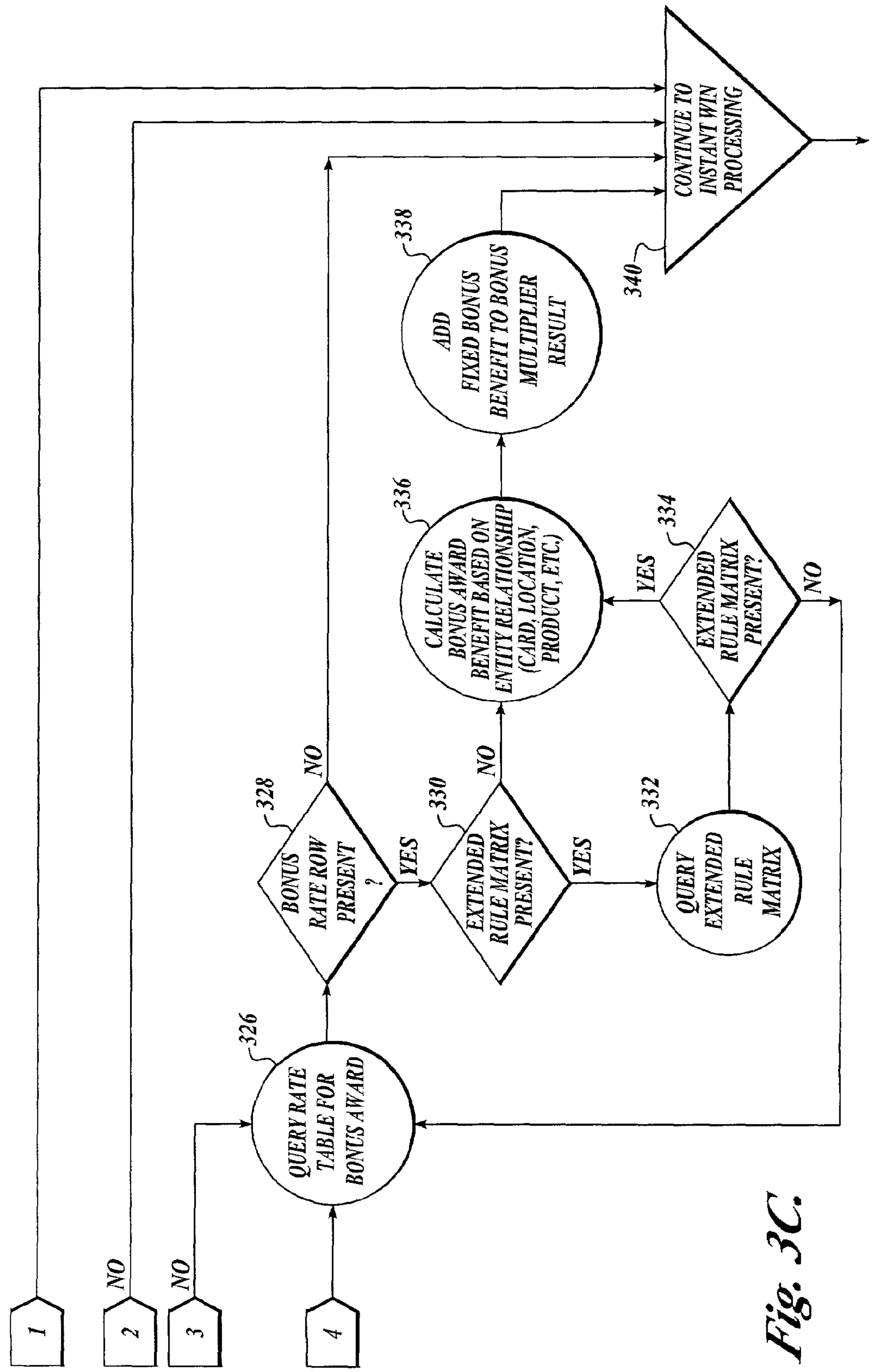

FIGS. 3B and 3C illustrate detailed schematic flow charts 300 of rate calculation processing 108. Information compiled and forwarded during POT device and customer validation processing 224 is utilized by one or more software modules to determine benefit rate type 302. Benefit rate type may be of any conventional form, but in preferred embodiments comprise the accelerated format found in Points Multiplier Programs, which award benefits to customers on an escalating scale in relation to qualifying behavior. More specifically, each successive transaction at a particular merchant within a specified time frame that satisfy pre-selected criteria (i.e., qualifying behavior) amplifies the user's benefit, for example by a multiplicative factor. For purposes of illustration, if the benefit comprises points, then a first purchase earns the user double points, the second purchase earns triple points and the third purchase earns quadruple points, etc. Points may be allocated in a variety of ways, such as a percentage of the transaction amount; an established ratio of points per transaction dollar; fixed points per transaction dollar; and/or minimum and/or maximum number of points per transaction, and the like. Regardless of the regime or algorithm employed for allocating points, the points may be incorporated into one or more marketing programs employing the present systems and methods, and in particular into AAPs to further amplify allocated points in relation to behavior-based transactions.

One or more rate tables may be queried 304 to determine if a standard benefit is to be awarded. Processing routine(s) 306 further determine whether to award the rate presently determined or to engage further software routines to apply extended matrix rules analysis 308. If extended matrix rules analysis is appropriate for that particular merchant program and customer, a query is sent to one or more extended matrix rules module(s) 310. Additional routines determine if the appropriate extended matrix rule module has been found 312, and if so, one or more routine(s) calculate benefits to be awarded based on a plurality of merchant, customer and transaction variables 314. Additional routines add fixed award benefit(s) 316 to award calculation results 314.

At least one redemption rate type analysis module 318 may query one or more rate tables for redemption information 320. If processing systems 322 of the present invention determine the present redemption rate is to be applied, one or more software modules calculate the redemption benefit based on a plurality of merchant, customer and transaction data 324. Upon completion of redemption benefit analysis, processing routine(s) proceed to Instant Win processing 340. If the redemption rate determined from one or more redemption rate tables 320 is not to be applied, the host system also continues to Instant Win processing 340.

With reference to FIG. 3C, the present invention further comprises processing to determine whether one or more bonus benefits are to be awarded. One or more queries are sent to one or more rate tables to determine if the particular merchant program and customer are eligible for bonus benefits 326. One or more subroutines determine whether the present bonus rate is to be applied, and if not, system processing proceeds to Instant Win processing 340. Additionally, one or more subroutines may determine whether extended matrix rules analysis applies to bonus rate determination 330. If not, one or more software modules calculate the bonus award benefit based on one or more merchant, customer and transaction variables 336. Should extended matrix rules be applicable to that particular program, one or more queries 332 are sent to extended matrix rules modules, and when located 334, are applied to a plurality of customer, merchant and transaction data 336 to determine the appropriate bonus award benefit. Additional routines may add fixed bonus benefits to points multiplier results 338, and proceed to Instant Win processing 340.

Some or all of the customer, merchant and transaction data generated during customer transactions is captured and stored by the systems and methods of the present invention. Preferred embodiments of the present invention update relevant databases in real-time. In this way, customer accounts are updated as quickly as technology allows, which enables customers to carry out as many transactions as desired and be presented with an up to date account statement summarizing the status of their transaction history.

Throughout the processes described above, collision detection software routines are integrated to prioritize which benefit or benefits are to be awarded to the customer. For example, one embodiment of the present invention may only award one benefit per transaction, and if multiple benefits are awarded, for instance an Instant Win benefit and a custom coupon are both awarded, collision detection software will prioritize which benefit is to be awarded. In alternative embodiments of the present invention, multiple benefits from a number of marketing programs may be awarded.

Marketing programs of the present invention are integrated with and supported by one or more matrix rules modules integrated with one or more databases, which enable sophisticated multi-variable, cross-matrix analysis of customer, merchant and transaction data. As described in the Examples, marketing programs of the present invention predetermine awards based on a combination of customer identifier(s), merchant identifier(s), and most significantly, customer behavior(s). Marketing programs of the present invention may comprise several layers of increasing complexity in determining benefits to be awarded. Matrix rules modules may be based on any available data or information pertaining to customers, merchants and transaction data. Examples of variables, and therefore rule applications, which may be employed in matrix rules modules include, but not limited to, day of week; hour range within day; specific program or campaign; specific POT device sales category; specific POT device; specific AAP or other program class; transaction amount range; specific transaction type; number of purchases over time; number of products purchased; time since last purchase; days before and after cardholder's birthday; and the like.

The application of one or more matrix rules provides a method and system having a vast number of possible configurations. Any number of marketing programs, and in preferred embodiments, Points Multiplier Programs may be arranged in a hierarchical, nested, concentric or overlapping manner for any number of merchants, groups of merchants and coalition marketing groups. For example, FIGS. 4A-C illustrate various configurations of AAPs and other marketing programs. FIG. 4A illustrates three different merchants with 3 separate and unique AAPs. Merchant 2 and 3 also participate in a common custom coupon campaign, and all three merchants participate in a common Swipe 'N Win campaign. Alternatively, numerous merchants may share in a common AAP of their design, as illustrated in FIG. 4 B. Merchants A-D participate in AAP campaign X, while merchants E-H participate in AAP Y, yet both groups, or coalitions of merchants participate in a common custom coupon campaign. In yet another example, FIG. 4C illustrates a chain of stores having a unique AAP running in conjunction with unique Swipe 'N win and custom coupon campaigns. As illustrated in the examples, merchants may add additional rules to a marketing programs and/or AAPs and therefore provide additional benefits to customers for satisfying predetermined criteria. For example, a merchant may wish to sell more of a particular brand or increase patronage during certain days of the week or even hours of the day; rules may be configured to provide added benefits to customers satisfying those criteria. Systems and methods of the present invention enable merchants to tailor AAPs on an ongoing basis to drive consumer behavior in ways most profitable to the merchant. As can be readily appreciated, more than one type of marketing program may run concurrently at each merchant. If multiple marketing programs are running at a single merchant, more than one customer identifier may be employed, permitting the customer to participate in more than one marketing program. In alternative embodiments, collision software may be implemented to prioritize one or more marketing programs and/or AAPs, whereby only a single customer identifier maps to one marketing program and/or AAP. Preferred embodiments of the present invention obviate the need for customers to choose between various marketing programs offered at merchants.

Embodiments of the present invention provide for combination cards, or "combo-cards," wherein a transaction and/or membership card may have one or more, and preferably multiple, AAPs and/or other marketing programs associated with it. Combo-cards may have conventional credit or debit accounts associated with them, as well as one or more marketing programs and/or AAPs and may include any commerce-related card, and/or membership cards in any organization, group, club, coalition and the like. Combo-cards may also include cards having an embedded electronic microchip, such as a contact or contactless Smart Card, as well as other comparable technologies. One or more AAPs and/or other marketing programs may be established at the time of issuance, or alternatively, may evolve by having additional AAPs and/or other programs added over time. Combo-cards may be used at any participating merchant. The present invention provides systems and methods capable of supporting transaction information for multiple AAPs and/or other programs, such as other merchant loyalty programs, association loyalty programs, gift card programs, custom coupons, instant prizes, and the like.

Embodiments of the present invention provide systems and methods enabling a "single-swipe" transaction for combo-cards, e.g. transaction cards having conventional credit and/or debit accounts in addition to a plurality of marketing programs and/or AAPs. Systems and methods of the present invention enable merchants to perform a single electronic reading, scanning, or "swipe" of a customer's combo-card to transmit one or more data signals to either, or both, transaction card institutions and/or the host central controller. Embodiments of the present invention preferably operate outside traditional banking transaction models. In traditional banking transaction models, transaction cards are read at the POT device and a remote database is accessed to verify the consumer's credit and to log charges on the customer's account. In one embodiment of the present invention, data transmission relating to both AAP accounts (alone or in conjunction with other marketing programs) and transaction cards may be transmitted to the host central controller, which may act as a server for receiving and forwarding transmissions to appropriate transaction card institutions. Preferred embodiments of the present invention have POT devices, and/or associated in-house systems, programmed to recognize combo-cards and/or transaction cards having one or more marketing programs, and/or AAPs, through any conventional medium, such as BIN numbers and/or other identifiers. Preferred embodiments have marketing program(s)/AAP(s) transactions performed after payment authorization has been approved, which assures benefits are awarded provided payment is made.

Systems and methods of the present invention include the capacity to deliver messages back to the POT device as part of the transaction response. Systems and methods of the present invention further comprise one or more dynamic messaging modules, which create a statement having one or more personalized messages that summarize the customer's marketing and/or AAP account. FIGS. 5 and 6 represent two exemplary embodiments of statements created by dynamic messaging modules. Examples of textual information provided on a statement may include any pertinent merchant information, such as name, address, store number, operator identifier, POT device identifier, name of marketing program and/or AAP, and the like; transaction information, such as transaction card number, date, time, merchandise identifier and price, payment method and amount, invoice number, and the like; customer, such as name, address, phone number, etc.; and, customer account information, such as account number, name of marketing program, points earned, current points, lifetime cumulative points and the like. To provide additional flexibility in the presentation of the message, host controller preferably includes formatting codes in the body of the text message. Data packet(s) containing information for printing one or more statements are forwarded to terminal handler/translator, which converts data packet(s) into one or more useable formats for the particular POT device and forwards the converted data packet to the original POT device. Data packets containing information for printing one or more statements are received by the original POT device and printed, or presented in a suitable format, such as a screen display on a personal computer. Preferred embodiments of the present invention may have statements transmitted and printed/presented in real-time.

Systems and methods of the present invention provide custom coupons, which represent one or more communications directly marketed to customers in a personal and customized manner. Marketing programs and/or AAPs implemented in conjunction with custom coupons enable merchants to create specific marketing campaigns designed to reward customers for fulfilling predetermined criteria or customer behaviors. Custom coupons are preferably printed at the POT device in real-time. FIG. 5 is an illustrative example of one embodiment of a custom coupon provided in the context of a statement. Custom coupons may take any conventional form, and offer any marketing incentive, such as cash discounts on present and future transactions, free goods and services, and the like. Systems and methods employing custom coupons enable merchants to directly place an offer into the hands of the most likely prospects; track the success of the specific promotions; increase customer satisfaction by directing personal, customized and meaningful coupons to them; promote high margin and/or new products; and create powerful cross-marketing programs with merchant partners. As previously described, extended matrix rules modules may be applied to custom coupon processing steps to enable merchants to design marketing programs, and especially AAPs, to pre-select qualifying behavior, which when fulfilled by customers, may be further rewarded with custom coupons. In preferred embodiments of the present invention, systems and methods are provided whereby custom coupon redemption may be tracked, allowing merchants to measure the success of the campaign.

The present invention further provides for one or more "Swipe 'N Win" sweepstakes program(s) implemented in conjunction with one or more marketing programs and/or AAPs. Swipe 'N Win sweepstakes programs, or Instant Win programs, serve to increase customer purchase frequency by awarding one or more benefits based on use of transaction cards coupled to one or more marketing programs and/or AAPs. In certain embodiments, customers may not be required to purchase goods or services to be eligible to participate in Swipe 'N Win sweepstakes programs. In preferred embodiments, winning customers are notified through dynamic messaging transmitted to the POT device in real-time. FIG. 6 is an example of one possible embodiment of a Swipe 'N Win notice, wherein customers are presented with a statement having a custom prize message. Custom prize messages may be in the form of one or more Swipe 'N Win Vouchers, or comparable form of notice. As with other aspects of the present invention, Swipe 'N Win sweepstakes modules may be integrated to with matrix rules processing to enable merchants to establish various criteria for eligibility. FIG. 7 shows a statement, integrated with a receipt and a payment agreement, illustrating participation in an Award Accelerator Program.

Benefits may be redeemed at participating merchants. Redemption, as used herein, is one or more transactions wherein a customer/cardholder may convert accumulated benefits into goods and/or services. Redemption may take any form which enables customers to realize their benefits, such as, but necessarily limited to loyalty points redeemed as cash; as a token to be traded for products and/or services; and/or a discount on the purchase of products or services. Redemption may be premised upon any appropriate criteria, such as, but not limited to customer behavior, threshold point accumulations, threshold dollar-value accumulations, acquisition of goods and/or services as stipulated by campaign rules.

Systems and methods of the present invention further provide an escalating revenue model for marketing programs and/or AAPs. In preferred embodiments, participating merchants pay a negotiated percentage of purchases made through transaction cards having one or more marketing programs and/or AAPs associated with them. For each additional purchase, the participating merchant will pay an incremental percentage to cover the costs of additional point bonuses and associated transaction fees. For example, a first purchase may generate 10% of revenue, a second visit may generate 12% and a third purchase may generate 13%, and so on up to an agreed-upon maximum percentage of the transaction value.

While the methods and systems of the present invention have generally been described in connection with implementations that use conventional point of sale transaction systems, it will be recognized that any of the systems and methods of the present invention may additionally, or alternatively, be implemented directly over the Internet or another communications system. Thus, for example, points (or other award currency) may be awarded or redeemed from an Internet site upon presentation and validation of qualifying customer identifier, a qualifying merchant or merchant group identifier, and a qualifying customer behavior. Systems and communications links for implementing on-line such systems are well known in the art. A point of transaction device may also be a personal computer, a personal digital device, such as a PDA, a communications device, or the like, that is in communication with a communications network, such as the Internet, and that can communicate a customer identifier, over the communications network, to a host controller. Thus, customers may participate in awards programs of the present invention using any device that can communicate over a communications network with a host controller.

The following examples are offered by way of illustration and not by way of limitation.

EXAMPLES

The following examples are illustrative of just a few of the many specialized marketing programs and features contemplated using methods and systems of the present invention. The methods and systems of the present invention are not limited to these illustrative examples. In fact, the examples serve to illustrate the flexibility of marketing implementations and the diverse range of marketing programs contemplated by the present invention. The examples are prophetic.

Jim's Wine Club operates two retail outlets selling both premium and low-cost wines and related wine products. Jim's Wine Club also operates an Internet site, over which it sells wines and wine-related products. Jim's Wine Club, working with a marketing program administrator operating a host controller of the present invention, implements a variety of marketing programs.

In a first program, Jim's Wine Club implements a simplified AAP. Visitors to Jim's Wine Club are invited to join the JWC bonus program. They fill out a membership form and provide specified information, such as name, address, age, annual earnings, e-mail address, and the like. A loyalty card bearing one or more unique customer identifier(s) is issued to each member, and the unique customer identifier(s) are stored in a database. Each member's information is linked to that member's unique customer identifier(s), organized and stored in one or more member data tables that communicate with the program administrator host controller.

JWC, working with the marketing program administrator, designs a marketing program under which points are awarded each time a member card is presented at JWC. The number of points awarded for a first transaction may be in a 1:1 relation to the dollar purchase value, excluding tax, of the first transaction. The number of points awarded for a second transaction may be in a 1.5:1 relation to the dollar purchase value, excluding tax, of the second transaction. The number of points awarded for a third transaction may be in a 2:1 relation to the dollar purchase value, excluding tax, of the third transaction, and so on. A program matrix rules module is designed to implement this AAP and is linked to the host controller. This is illustrative of an AAP in which award value is accelerated based on a customer behavior, namely the frequency of purchases. Different multiplier relationships may be implemented, as determined by the merchant, and multipliers for successive customer behaviors need not be proportional.

Another feature of a JWC marketing program may award a predetermined number of points, for example, upon presentation of the member loyalty card when no purchase transaction is associated with the card presentation. A maximum point award value for card presentations over a specified period of time may be imposed when no transaction is associated with the card presentation. If ten (10) points are awarded upon card presentation at a JWC location, a maximum of twenty (20) points may be awarded to each member during a one-month period, for example, for card presentations that are not associated with a purchase transaction.

Based on information gathered from its simplified AAP program, JWC learns that its customers are predominantly male. While it appreciates the purchases made by its male customers, it would like to encourage female customers to visit and purchase from JWC. JWC advertises a special promotion offering a specialized AAP program for women customers for an initial six-month period. Under the specialized AAP program, the regular AAP award category is doubled when a customer identifier is associated with a female program member. Thus, the number of points awarded for a female member's first transaction may be in a 2:1 relation to the dollar purchase value, excluding tax, of the first transaction. The number of points awarded for a female member's second transaction may be in a 3:1 relation to the dollar purchase value, excluding tax, of the second transaction. The number of points awarded for a female customer's third transaction may be in a 4:1 relation to the dollar purchase value, excluding tax, of the third transaction, and so on. This is illustrative of an AAP in which award value is accelerated based on a customer behavior, namely the frequency of purchases. Different multiplier relationships may be implemented, as determined by the merchant, and multipliers for successive customer behaviors need not be proportional. This specialized, targeted AAP program may be implemented simultaneously with the simplified AAP, which would apply to male members.

Frequency of purchases and/or visits to a participating merchant is only one exemplary customer behavior that may be rewarded using marketing programs and systems of the present invention. Purchase volume may also be rewarded, according to individual purchase transactions or cumulative transactions, using an AAP system. Using marketing information collected using the simplified AAP, JWC learns that the average purchase transaction is $27.00. One marketing objective, therefore, is to increase the average purchase transaction amount. JWC, working with its marketing program administrator, designs an AAP in which members receive a first level of points, in a 1:1 relationship to the purchase transaction amount, for purchases up to $50.00; members receive a second level of points, in a 2:1 relationship to the purchase transaction amount, for purchases up to $100.00; members receive a third level of points, in a 3:1 relationship to the purchase transaction amount, for purchases up to $250.00, and so on. According to one embodiment, points are awarded on the basis of individual purchase transactions. According to another embodiment, points are awarded on the basis of cumulative purchase transactions over specified time intervals.

Based on information acquired as a consequence of one of its marketing programs, JWC also learns that weekday purchase transaction volumes are substantially lower than weekend purchase transaction volumes. JWC would therefore like to motivate its members to purchase during the week in addition to on the weekend. JWC decides to extend its hours into the evening during the week and offer a bonus program, optionally in connection with one or more of the AAPs described above. A fixed or variable number of bonus points is awarded in relation to customer purchases made during the week, or in relation to aggregate weekday purchase volume over a specified period, or the like.

In addition to other marketing programs, such as AAPs, or separately, JWC may also implement an instant win marketing program. The instant win program may be directed to all members or a specified member group, based on one or more customer identifier(s). Alternatively, eligibility for the instant win program may be based on individual transaction value, cumulative transaction value, specific items purchased, or the like. JWC may run an instant win marketing program, for example, to promote French wines during the month of May. A qualifying behavior would thus involve a qualifying transaction item associated with a qualifying member. Alternatively, the instant win program may award instant win chances based on a transaction purchase value, frequency, or the like.

The marketing programs implemented by JWC were fabulously successful and JWC is opening two additional retail outlets in geographically disparate locations. JWC would like to expand its qualifying customer base and gain access to new members living in geographical proximity to its new retail outlets that have a requisite level of purchasing power. JWC therefore negotiates with a credit or financial institution having a card member base to offer marketing programs to the card member base. The credit or financial institution is pleased to offer a program providing savings at JWC to its card member base, or the portion of its card member base living or working within a specified distance from any of the JWC outlets. The credit or financial institution provides information relating to its card members, including unique customer identifier(s) and various demographic information, to the marketing program administrator. Qualifying card members making purchases at JWC are validated as eligible members and participate in one or more marketing programs, such as AAPs, instant win, coupons, or the like, offered by JWC. There are several ways in which a merchant or merchant group may work with an established group or subset of card holders.

In a first embodiment, specified members of a card holder group, or specified members of any group or association may simply be added to the JWC participating customer database, so that the participating customers would be recognized and validated through the JWC awards program. In a second system, a financial institution or another organization or group has a specialized loyalty program associated with a transaction card, such as a credit card or membership card. In this situation, JWC may participate in the existing organization or group specialized loyalty program by giving awards in the existing loyalty program based on JWC transactions. In this system, JWC effectively purchases awards (e.g., points) from the existing loyalty program and awards JWC customers in a (pre-existing) currency other than JWC awards. This supercharges existing awards programs, while at the same time making them merchant or merchant group specific. In yet another embodiment, JWC may layer an awards program on top of a pre-existing awards program by awarding JWC-specific awards, such as JWC points for each qualifying transaction, and additionally awarding points, for example, from the existing loyalty program.

Specialized marketing programs may be offered to any card holder or member base, according to methods and systems of the present invention, provided that one or more unique customer identifier(s) is associated with each individual participant. Multiple marketing programs, such as AAPs, specialized promotions, and the like, associated with multiple merchants and/or multiple merchant groups may be administered through a host controller system operated by a marketing program administrator. And, multiple marketing programs, associated with multiple merchants and/or multiple merchant groups, may be administered using a single unique customer identifier, such as a credit or debit card number, or part of a credit or debit card number, a membership number, or the like. The award currency may be different for each awards program, or a single, unified currency may be used for multiple programs. And, multiple awards programs may operate based on a single qualifying transaction.

One of the new JWC retail outlets is located in a newly constructed shopping mall facility. A collection of merchants located in the new shopping mall would like to join together in a coalition to offer marketing programs designed to encourage shoppers to visit the mall. To encourage customer visits, the coalition of merchants, including the JWC retail outlet, works with the marketing program administrator to design a marketing program under which points are awarded each time a member card is presented at one of the members of the merchant coalition. The number of points awarded for a first purchase transaction with a coalition member may be in a 1:1 relation to the dollar purchase value of the first transaction. The number of points awarded for a second transaction with a coalition member may be in a 2:1 relation to the dollar purchase value of the second transaction. The number of points awarded for a third transaction with a coalition member may be in a 3:1 relation to the dollar purchase value of the third transaction, and so on.

The points may be redeemable for awards through all or any selected members of the merchant coalition. This is illustrative of a merchant coalition AAP in which award value is accelerated based on a customer behavior, namely the frequency of purchases. Different multiplier relationships may be implemented, as determined by individual merchants and the coalition, and multipliers for incremental customer behaviors need not be proportional. Other types of marketing programs, such as instant win, coupons, and the like, may be implemented by individual coalition members or selected groups of coalition members separately, or in association with the AAP program. Similar types of marketing programs may be administered in other types of merchant groups, such as merchant chains, and the like. Gift certificates in the award currency may also be issued by any member of the merchant group or coalition and may be redeemable at all or selected individual merchants in the group.

There is a downturn in wine sales and JWC closes three of its retail locations, while investing in its Internet site in an effort to boost Internet sales. JWC works with its marketing program administrator to design a marketing program targeted to customers ordering over the Internet. Any of the marketing programs described above, and in the specification, may be administered upon validation of one or more unique customer identifier(s), which may be transmitted to the marketing program host controller by a customer through a network communications system such as the Internet. Any computing device having communications capability may thus serve as a point of sale terminal, and any qualifying individual with a computing device having communications capability may participate in marketing programs using the methods and systems of the present invention. And, transactions made via personal computing devices may be integrated in a marketing program with transactions consummated at a participating merchant location, and visa versa.

It will be understood that the foregoing discussion is merely illustrative of the invention and its principles. Modifications and variations in the details of the methods and systems of the present invention will occur to those skilled in the art to which this invention pertains. Those modifications and variations are intended to fall within the scope and purview of this disclosure and the following claims.

We claim:

1. An automated marketing method implemented using a host controller that administers a plurality of award benefits programs sponsored by a plurality of merchants, comprising:

a. acquiring a unique user identifier, a unique merchant identifier and transaction data at a location remote from the host controller;

b. communicating each of the identifiers and the transaction data to the host controller over a communications network;

c. determining eligibility of at least one of the user identifier, the merchant identifier and the transaction data for participation in at least one award benefits program among the plurality of award benefits programs implemented by the host controller;

d. accessing a program matrix rules module containing a plurality of predetermined award criterion corresponding to the at least one award benefits program implemented by the host controller, applying the program matrix rules to validate the transaction data, the customer identifier and/or the merchant identifier for eligibility for an award benefit to the user and analyze the user identifier, the merchant identifier and/or the user behavior identifier to determine at least one predetermined award benefit available to the user when at least one preselected award criterion is satisfied;

e. applying an award prioritization system that selects a single award benefit when a user qualifies for multiple award benefits; and f. communicating information relating to the award benefit or an updated award status from the host controller to the location remote from the host controller.

2. An automated marketing method of claim 1, additionally comprising accessing user demographic information based on the user identifier prior to accessing the program matrix rules module.

3. An automated marketing method of claim 1, additionally comprising storing the transaction data and information relating to assignment of an award to the user at the host controller.

4. An automated marketing method of claim 1, additionally comprising acquiring a transaction payment identifier, wherein the user identifier and the transaction payment identifier are acquired in a single examination of an identifying object.

5. An automated marketing method of claim 1, additionally comprising delivering a statement to the point of transaction having a personalized message relating to a user's account.

6. An automated marketing system comprising a host controller that communicates with a point of transaction device over a network interface during the course of a transaction and administers a plurality of award benefits programs having different award benefits rules, wherein:

the host controller system comprises at least one user identifier database, at least one merchant database, and a plurality of program matrix rules modules for implementing a plurality of marketing programs;

the host controller system is capable of receiving a user identifier, a merchant identifier and a user behavior identifier acquired from a device at a point of transaction over the network interface;

the host controller is capable of validating the eligibility of the user to participate in multiple award benefits programs involving multiple award sponsors based on at least one of the user identifier, the merchant identifier and the user behavior identifier;

the host controller is capable of selecting a program matrix rules module associated with the eligible award benefits program and performing a rate calculating processing step applying a preselected set of criteria stored in the program matrix rules module associated with the eligible award benefits program to determine eligibility for an award benefit based on the preselected set of criteria stored in the program matrix rules module;

the host controller is capable of selecting a single award benefit, or multiple award benefits from among qualified award benefits based on predetermined award priorities; and the host controller is capable of communicating information relating to an award benefit or an updated award status condition to the device at the point of transaction over the network interface.

7. An automated marketing system of claim 6, wherein the at least one marketing program is associated with a plurality of merchant identifiers to join multiple merchants in a coordinated marketing program.

8. An automated marketing system of claim 6, wherein the multiple award sponsors are multiple merchants.

9. An automated marketing system of claim 6, wherein the host controller is capable of validating the eligibility of the user to participate in at least one marketing program based upon recognition and validation of more than one unique customer identifier.

10. An automated marketing system of claim 6, wherein the host controller is additionally capable of updating user and merchant databases with information obtained from each transaction.

11. An automated marketing system of claim 6, wherein the host controller is additionally capable of storing data relating to users, merchants and user behaviors.

12. An automated marketing system of claim 6, wherein the host controller is additionally capable of receiving a redemption inquiry, accessing an award balance associated with the user identifier and determining whether an award balance associated with the user identifier satisfies inquiry.

* * * * *